United States Patent
Gupta et al.

(10) Patent No.: US 11,803,513 B2
(45) Date of Patent: Oct. 31, 2023

(54) USING A STORAGE SYSTEM TO OPTIMIZE AND MAINTAIN THE METADATA ASSOCIATED WITH A PLURALITY OF SMALL FILES

(71) Applicant: Cohesity, Inc., San Jose, CA (US)

(72) Inventors: Apurv Gupta, Bangalore (IN); Anirvan Duttagupta, San Jose, CA (US)

(73) Assignee: Cohesity, Inc., San Jose, CA (US)

( * ) Notice: Subject to any disclaimer, the term of this patent is extended or adjusted under 35 U.S.C. 154(b) by 0 days.

(21) Appl. No.: 17/174,103

(22) Filed: Feb. 11, 2021

(65) Prior Publication Data

US 2021/0240662 A1 Aug. 5, 2021

Related U.S. Application Data

(63) Continuation of application No. 16/426,390, filed on May 30, 2019, now Pat. No. 10,949,384.

(60) Provisional application No. 62/693,742, filed on Jul. 3, 2018.

(51) Int. Cl.
*G06F 16/11* (2019.01)
*G06F 16/901* (2019.01)
*G06F 16/907* (2019.01)

(52) U.S. Cl.
CPC .......... *G06F 16/128* (2019.01); *G06F 16/113* (2019.01); *G06F 16/907* (2019.01); *G06F 16/9027* (2019.01)

(58) Field of Classification Search
None
See application file for complete search history.

(56) References Cited

U.S. PATENT DOCUMENTS

| | | | |
|---|---|---|---|
| 6,779,095 B2 | 8/2004 | Selkirk | |
| 10,467,107 B1 | 11/2019 | Abrol | |
| 11,023,318 B1* | 6/2021 | Volkov | G06F 16/1805 |
| 2007/0055702 A1* | 3/2007 | Fridella | G06F 16/122 |
| 2008/0270461 A1 | 10/2008 | Gordon | |
| 2015/0134879 A1* | 5/2015 | Zheng | G06F 11/1451 |
| | | | 711/114 |
| 2015/0370502 A1 | 12/2015 | Aron | |
| 2017/0075781 A1* | 3/2017 | Bennett, Jr. | G06F 3/0619 |

(Continued)

OTHER PUBLICATIONS

Wei Xu; An efficient and backwards-compatible transformation to ensure memory safety of C programs; SIGSOFT; 2004; pp. 117-126 (Year: 2004).*

(Continued)

*Primary Examiner* — Albert M Phillips, III
*Assistant Examiner* — Jermaine A Mincey
(74) *Attorney, Agent, or Firm* — Van Pelt, Yi & James LLP

(57) ABSTRACT

A size associated with a first content file is determined to be less than a threshold size. In response to determining that the size associated with the first content file is less than the threshold size, a combined metadata structure is updated at least in part by combining metadata of the first content file with metadata of a second content file in the combined metadata structure. A snapshot tree is updated to reference a first portion of the combined metadata structure corresponding to the first content file and to reference a second portion of the combined metadata structure corresponding to the second content file.

19 Claims, 20 Drawing Sheets

(56) References Cited

U.S. PATENT DOCUMENTS

2018/0165300 A1* 6/2018 Okun .................. G06F 16/2246

OTHER PUBLICATIONS

Anonymous, "brad's life—Brackup 1.02", May 28, 2007, retrieved from internet URL https://web.archive.org/web/20070528031712/http://brad.livejournal.com/2322125.html [retrieved on Aug. 27, 2019].

Qing et al. "DeltaFS: Exascale File Systems Scale Better Without Dedicated Servers"; 2015; ACM; pp. 1-6.

Vrable et al., "Cumulus", ACM Transactions on Storage, Association for Computing Machinery, New York, NY, US, vol. 5, No. 4, Dec. 14, 2009, pp. 1-28.

* cited by examiner

USING A STORAGE SYSTEM TO OPTIMIZE AND MAINTAIN THE METADATA ASSOCIATED WITH A PLURALITY OF SMALL FILES

CROSS REFERENCE TO OTHER APPLICATIONS

This application is a continuation of U.S. patent application Ser. No. 16/426,390, entitled USING A STORAGE SYSTEM TO OPTIMIZE AND MAINTAIN THE METADATA ASSOCIATED WITH A PLURALITY OF SMALL FILES filed May 30, 2019 which is incorporated herein by reference for all purposes, which claims priority to U.S. Provisional Patent Application No. 62/693,742 entitled SMALL FILE OPTIMIZATION AND MAINTENANCE filed Jul. 3, 2018 which is incorporated herein by reference for all purposes.

BACKGROUND OF THE INVENTION

A file system is used to control how data is stored on and retrieved from a storage medium. Without a file system, information placed in the storage medium would be one large body of data with no way to tell where one piece of information stops and the next begins. A file system is responsible for organizing files and directories, and keeping track of which areas of the storage medium belong to which file and which are not being used. A file system also manages access to both the content of files and the metadata associated with those files.

A file system may store the metadata associated with a content file, including the file name, the length of the contents of a file, and the location of the file, separate from the contents of the file. A file system may allocate a default minimum amount of space on the storage medium for metadata associated with a content file. The storage medium may store the data associated with a large number (e.g., hundreds, thousands, millions, etc.) of small files (e.g., files with a size less than a threshold size). The actual size of a small file may be a small fraction of the default minimum amount of space. The amount of overhead in maintaining the metadata associated with the large number of small files may be burdensome on system resources. Creating the metadata associated with a file also uses a certain amount of system resources each time the metadata is generated. The amount of system resources used to generate the metadata may be significant when a large number of small files are created.

BRIEF DESCRIPTION OF THE DRAWINGS

Various embodiments of the invention are disclosed in the following detailed description and the accompanying drawings.

DETAILED DESCRIPTION

Figure 1:
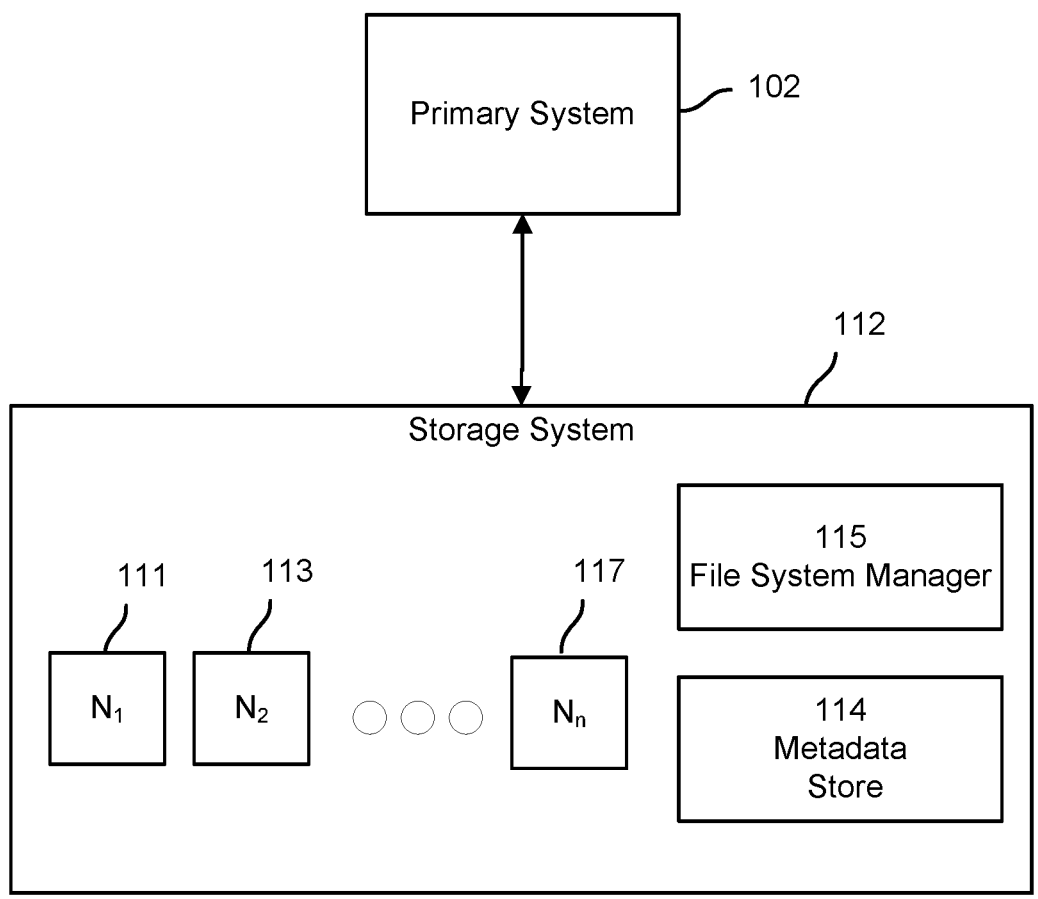
FIG. 1 is a block diagram illustrating an embodiment of a system for optimizing and maintaining the metadata associated with a plurality of small files.

A primary system may be comprised of an object, virtual machine, physical entity, file system, array backup, and/or volume that stores file system data. The file system data may be comprised of a plurality of content files and their associated metadata. The primary system may perform a backup snapshot of file system data according to a backup policy and send the backup snapshot to a storage system. A backup snapshot may represent the state of a system at a particular point in time (e.g., the state of the file system data). The backup snapshot policy may require a full backup snapshot or an incremental backup snapshot to be performed. A full backup snapshot includes the entire state of the primary system at a particular point in time. An incremental backup snapshot includes the state of the primary system that has changed since a last backup snapshot.

A storage system may receive and store the backup snapshot. A file system manager of the storage system may allocate a default minimum amount of storage space for metadata associated with a content file included in the backup snapshot. The storage system may store the data associated with a large number (e.g., hundreds, thousands, etc.) of small files (e.g., files with a size less than a threshold size) associated with the backup snapshot. The actual size of a small file may be a small fraction of the default minimum amount of space. The amount of overhead in maintaining the metadata associated with the large number of small files may be burdensome on system resources. Creating the metadata associated with a file also uses a certain amount of system resources each time the metadata is generated. The amount of system resources used to generate the metadata may be significant when a large number of small files are created.

In other embodiments, the storage system may serve as storage for a user associated with the storage system. The storage system may be configured to store a plurality of files generated on or by the storage system (e.g., a system generated file, a user generated file, an application generated file, etc.). The storage system may also allocate the default minimum amount of space for metadata associated with the plurality of files. The actual size of the plurality of files may also be a small fraction of the default minimum amount of space. The amount of overhead in maintaining the metadata associated with the plurality of files may also be burdensome on system resources.

A file system manager of the storage system may use a tree data structure to organize the file system data of the backup snapshot and/or the data associated with the plurality of files generated on or by the storage system. An example of the tree data structure is a snapshot tree (e.g., Cohesity Snaptree®), which may be based on a B+ tree structure (or other type of tree structure in other embodiments). The tree data structure may provide a view of the file system data corresponding to a backup snapshot. The view of the file system data corresponding to the backup snapshot may be comprised of a snapshot tree and a plurality of file metadata trees (e.g., Blob structures). A file metadata tree is a metadata structure that stores the metadata associated with a file. Regardless if the view of the file system data corresponds to a full backup snapshot or an incremental backup snapshot, the view of the file system data corresponding to the backup snapshot provides a fully hydrated backup snapshot that provides a complete view of the primary system at a moment in time corresponding to when the backup snapshot was performed.

A fully hydrated backup is a backup that is ready for use without having to reconstruct a plurality of backups to use it. Systems may reconstruct a backup by starting with a full backup and applying one or more changes associated with one or more incremental backups to the data associated with the full backup. In contrast, any file stored on the primary system at a particular time and the file's contents, for which there is an associated backup snapshot, may be determined from the snapshot tree, regardless if the backup snapshot associated with the snapshot tree was a full backup snapshot or an incremental backup snapshot. Creating an incremental backup snapshot of a primary system may include only copying data of the primary system that was not previously backed up. However, a snapshot tree corresponding to an incremental backup snapshot provides a complete view of the primary system at the particular moment in time because it includes references to data of the primary system that was previously stored. For example, a root node associated with the snapshot tree may include one or more references to nodes associated with one or more previous backup snapshots and one or more references to nodes associated with the current backup snapshot. This provides significant savings in the amount of time needed to restore, recover, or replicate a database file. In contrast, some recovery/restoration methods may require significant time, storage, and computational resources to reconstruct a particular version of a database file from a full backup and a series of incremental backups.

A snapshot tree may include a root node, one or more levels of one or more intermediate nodes associated with the root node, and one or more leaf nodes associated with an intermediate node of the lowest intermediate level. The root node of a snapshot tree may include one or more pointers to one or more intermediate nodes. Each intermediate node may include one or more pointers to other nodes (e.g., a lower intermediate node or a leaf node). A leaf node may store file system metadata (e.g., metadata associated with a content file that is less than or equal to a limit size (e.g., 256 kB)), data associated with a file (e.g., data fragment) that is less than or equal to smaller than the limit size, an identifier of a data brick, a pointer to a file metadata tree (e.g., Blob structure), or a pointer to a data chunk stored on the storage system. A leaf node may correspond to a data brick. The data brick may have a corresponding brick number. The leaf node may correspond to an Mode.

The tree data structure may be used to capture different versions of backup snapshots. The tree data structure allows a chain of snapshot trees corresponding to different versions of backup snapshots (i.e., different snapshot tree versions) to be linked together by allowing a node of a later version of a snapshot tree to reference a node of a previous version of a snapshot tree (e.g., a "snapshot tree forest"). For example, a root node or an intermediate node of the second snapshot tree corresponding to the second backup snapshot may reference an intermediate node or leaf node of the first snapshot tree corresponding to a first backup snapshot.

Content files that are bigger than the limit size (e.g., 256 kB) have an associated file metadata tree. The file metadata tree is a metadata structure and is configured to store the metadata associated with a content file. The file metadata tree may be referred to as a "file metadata structure." The file metadata tree may be stored in storage as a file separate from the content file. The file metadata tree may include a root node, one or more levels of one or more intermediate nodes associated with the root node, and one or more leaf nodes associated with an intermediate node of the lowest intermediate level. A file metadata tree is similar to a snapshot tree, but a leaf node of a file metadata tree includes an identifier of a data brick storing one or more data chunks of the content file or a pointer to the data brick storing one or more data chunks of the content file. The location of the data chunks associated with a data brick may be identified using a table stored in a metadata store that matches brick numbers to chunk identifiers or the location of the data brick may be identified based on the pointer to the data brick. A leaf node of a snapshot tree corresponding to a view of the file system data may include a pointer to the root node of the file metadata tree. A file table may associate chunk identifiers (e.g., SHA-1) with chunk files. A chunk file is configured to store a plurality of data chunks. The file table may associate a location of a chunk identifier with an offset within a chunk file.

The corresponding data associated with content files included in a version of file system data may be larger than the limit size (e.g., 256 kB), but smaller than a threshold size (e.g., 8 MB). Such files may be referred to hereinafter as "small files." For a particular backup snapshot, a file system manager may need to maintain a large number of file metadata trees because the data associated with the plurality of content files included in the particular backup snapshot may have a corresponding file metadata tree. The amount of overhead in maintaining the file metadata trees associated with a large number of files that are larger than the limit size and smaller than the threshold size may be burdensome.

The small file optimization technique disclosed herein may reduce the amount of overhead in maintaining the metadata associated with content files by reducing the number of file metadata trees that the file system manager needs to maintain. The number of system resources needed to create the file metadata trees may be reduced because fewer file metadata trees are generated for a plurality of small content files. A plurality of content files that are smaller than the threshold size are identified. The plurality of content files may include one or more content files that are smaller than the limit size and/or one or more content files that are bigger than the limit size but smaller than the threshold size. The size of a content file may be maintained by the file system manager or determined by traversing a snapshot tree. Some or all of the plurality of identified content files are selected. The view of the file system data is updated in part by generating a combined metadata structure. The combined metadata structure (i.e., a combined file metadata tree) is comprised of the file metadata trees associated with the plurality of selected content files. For each content file included in the combined metadata structure, a leaf node of a snapshot tree that points to a file metadata tree corresponding to one of the selected content files may be updated. The leaf node may be updated to point to the combined metadata structure (i.e., the combined file metadata tree). In some embodiments, the pointer of the leaf node may indicate a portion of the combined metadata structure to which the leaf node points. In other embodiments, a metadata store may indicate a portion of the combined metadata structure to which the leaf node points.

The metadata associated with the plurality of selected content files may be combined to reduce the amount of overhead to maintain the metadata associated with the plurality of content files. This may reduce the amount of overhead to maintain the plurality of small files because instead of having to maintain file metadata trees for each small file, a single file metadata tree may be maintained for the plurality of small files. After the plurality of file metadata trees are combined, the metadata associated with content file may be referenced based on a file offset of the combined metadata structure. For example, the metadata associated with a first content file may occupy the file range 0-2 MB of the combined metadata structure, the metadata associated with a second content file may occupy the file range 2 MB-4 MB of the combined metadata structure, and the metadata associated with a third content file may occupy the file range 4 MB-6 MB of the combined metadata structure. In some embodiments, metadata associated with a content file that is stored in a leaf node of a snapshot tree is removed from the leaf node and included in the combined metadata structure. This reduces the size of the metadata store because instead of storing the data chunks associated with the metadata associated with a content file in the snapshot tree, the data chunks associated with the metadata are now stored in storage.

The storage system may store a plurality of backup snapshots and corresponding views of the file system data corresponding to the plurality of backup snapshots. A retention time policy may indicate that a backup snapshot and corresponding view are to be deleted after a period of time has passed. However, a content file associated with a backup snapshot may be referenced by one or more other backup snapshots. For example, a content file may be stored on a primary system when a first backup snapshot is performed. The first backup snapshot may be a full backup snapshot. The content file may be sent to the storage system and stored. A view of the file system data corresponding to the first backup snapshot may include a file metadata tree corresponding to the content file. The content file may still be stored on the primary system when a second backup snapshot is performed. The second snapshot may be an incremental backup snapshot. Since the content file and its associated metadata were previously stored at the storage system, the primary system does not need to send the content file and its associated metadata to the storage system. When a view of the file system data corresponding to the second backup snapshot is generated, the view of the file system data corresponding to the second backup snapshot may include a reference to the view of the file system data corresponding to the first backup snapshot.

Each view of file system data corresponding to a backup snapshot may provide a complete view of the primary system at the moment in time corresponding to when the backup snapshot was performed. When a retention time policy condition is satisfied, a backup snapshot and corresponding view are to be deleted. However, deleting all of the content files associated with a backup snapshot may affect the views associated with file system data corresponding to other backup snapshots because the views associated with file system data corresponding to other backup snapshots may no longer be a fully hydrated backup snapshot. For example, deleting the content file associated with the first backup snapshot may prevent the view of the second backup snapshot from providing a complete view of the primary system at the moment in time corresponding to when the second backup snapshot was performed because the content file associated with the first backup snapshot was still stored on the primary system.

The file maintenance technique described herein allows a file system manager to determine which content files of a backup snapshot and associated metadata to delete and which content files of a backup snapshot and associated metadata to keep. In some embodiments, a user associated with the storage system may delete one or more files in the event the storage system is used as a primary storage. In some embodiments, a retention time policy condition is satisfied (e.g., a backup snapshot and associated view have been stored in storage for a particular amount of time) and it is determined that the backup snapshot and associated view are to be removed from storage. In the event the retention time policy condition has been satisfied, a file system manager may determine that the snapshot tree and associated file metadata trees are to be removed from storage. This reduces the storage needed to maintain the backup snapshot views because the data contained in the snapshot tree and file metadata trees associated with a backup snapshot view may not be needed after a certain amount of time has passed. The file system manager may use a reference count to determine which content files associated with a backup snapshot and associated metadata to delete and which content files associated with a backup snapshot and associated metadata to keep. The reference count indicates a number of backup snapshot views that reference a node included in a view. In some embodiments, each file metadata tree has an associated reference count. For example, a file metadata tree corresponds to metadata associated with a content file and a root node of the file metadata tree may be referenced by one or more views. In other embodiments, each portion of a file metadata tree corresponding to a content file has an associated reference count. For example, a file metadata tree may correspond to a plurality of content files. The metadata associated with a plurality of content files included in the combined file metadata tree may be referenced by different backup snapshot views. For example, the metadata associated with a first content file may be referenced by one backup snapshot while the metadata associated with a second content file may be referenced by two backup snapshots.

When a retention time policy condition is satisfied, the one or more content files associated with a backup snapshot and associated metadata to be deleted are identified by traversing the view of file system data corresponding to the backup snapshot to be deleted. A reference count associated with each of the identified files may be decremented. After the reference count associated with the content files has been decremented, the file system manager may determine to delete content files and associated metadata with a reference count of "0" and to keep content files with a reference count that is greater than "0." After the content files and associated metadata have been deleted, the file system manager may update a metadata store to indicate storage ranges that are unused. In some embodiments, metadata associated with a content file that is part of a combined metadata structure file is deleted. The file system manager may update the metadata store to indicate that an offset range of the combined metadata structure is unused. In some embodiments, the file system manager may modify the combine metadata structure such that the deleted portion of the combined metadata structure file is replaced with metadata associated with another content file.

The file maintenance technique improves the storage system because it enables the file system manager to determine unused file offset blocks that may be used by other small files. It allows a combined metadata structure to include metadata associated with other content files that were not previously combined with other metadata, which reduces the overhead and unused storage space associated with the other metadata.

FIG. 1 is a block diagram illustrating an embodiment of a system for optimizing and maintaining the metadata associated with a plurality of small files. In the example shown, system 100 includes primary storage system 102 and storage system 112.

Primary system 102 is a computing system that stores file system data. Primary system 102 may be comprised of one or more servers, one or more computing devices, one or more storage devices, and/or a combination thereof. Primary system 102 may be configured to backup file system data to storage system 112 according to one or more backup snapshot policies. In some embodiments, a backup snapshot policy indicates that file system data is to be backed up on a periodic basis (e.g., hourly, daily, weekly, monthly, etc.). In other embodiments, a backup snapshot policy indicates that file system data is to be backed up when a threshold size of data has changed. In other embodiments, a backup snapshot policy indicates that file system data is to be backed up upon a command from a user associated with primary system 102. The backup snapshot policy may indicate when a full backup snapshot of primary system 102 is to be performed. A full backup snapshot stores the entire state of the primary system, (i.e., all of the file system data) at a particular point in time. The backup snapshot policy may indicate when an incremental backup snapshot of primary system 102 is to be performed. An incremental backup snapshot stores the one or more data chunks of file system data that have changed since a last backup snapshot.

Storage system 112 is a storage system configured to store file system data received from primary storage system 102. Storage system 112 may protect a large volume of applications while supporting tight business requirements (recovery time objective (RTO) and recovery point objective (RPO)). Storage system 112 may unify end-to-end protection infrastructure—including target storage, provide backup, replication of data, disaster recovery, and/or cloud tiering. Storage system 112 may provide scale-out, globally deduped, highly available storage to consolidate all data, including backups, files, and test/dev copies. Storage system 112 simplifies backup infrastructure and eliminates the need to run separate backup software, proxies, media servers, and archival. Storage system 112 may be fully integrated with a virtual machine (VM) centralized management tool, such as vCenter, and an applications programming interface (API) for data protection. Storage system 112 may reduce the amount of time to perform RPOs and support instantaneous RTOs by creating a clone of a backup VM and running the VM directly from storage system 112. Storage system 112 may integrate natively with one or more cloud servers. Storage system 112 may replicate data to one or more cloud clusters to minimize potential data loss by replicating data as soon as a backup is completed. This allows data in the cloud to be used for disaster recovery, application migration, test/dev, or analytics.

Storage system 112 may be comprised of one or more storage nodes 111, 113, 117. The one or more storage nodes may be one or more solid state drives, one or more hard disk drives, or a combination thereof. Each storage node may have its own corresponding processor. The file system data included in a backup snapshot may be stored in one or more of the storage nodes. In one embodiment, storage system 112 is comprised of one solid state drive and three hard disk drives.

In other embodiments, storage system 112 serves as storage for a user associated with storage system 112. Storage system 112 may be configured to store a plurality of files generated on or by storage system 112 (e.g., a system generated file, a user generated file, an application generated file, etc.). Storage system 112 may also allocate the default minimum amount of space for metadata associated with the plurality of files. The actual size of the plurality of files may also be a small fraction of the default minimum amount of space. The amount of overhead in maintaining the metadata associated with the plurality of files may also be burdensome on system resources.

Storage system 112 may include a file system manager 115. File system manager 115 is configured to organize the file system data in a tree data structure. File system manager 115 may be configured to organize the data associated with a plurality of files generated on or by storage system 112 using a tree data structure. The tree data structure may include one or more leaf nodes that store a data key-value pair. A user may request a particular value by providing a particular data key to file system manager 115, which traverses a view of a backup snapshot to find the value associated with the particular data key. A user may request a set of content files within a particular range of data keys of a snapshot. File system manager 115 may be configured to generate a view of file system data based on a backup snapshot received from primary system 102. File system manager 115 may be configured to perform one or more modifications, as disclosed herein, to a snapshot tree. File system manager 115 may generate one or more snapshot trees corresponding to one or more backup snapshots received from primary system 102. File system manager 115 may also generate one or more snapshot trees corresponding to a state of the storage system 112 at different moments in time.

The tree data structure may be used to capture different versions of backup snapshots. The tree data structure allows a chain of snapshot trees corresponding to different backup versions of backup snapshots (i.e., different snapshot tree versions) to be linked together by allowing a node of a later version of a snapshot tree to reference a node of a previous version of a snapshot tree (e.g., a "snapshot tree forest"). For example, a root node or an intermediate node of the second snapshot tree corresponding to the second backup snapshot may reference an intermediate node or leaf node of the first snapshot tree corresponding to a first backup snapshot. The snapshot tree provides a view of the file system data corresponding to a backup snapshot.

A snapshot tree may include a root node, one or more levels of one or more intermediate nodes associated with the root node, and one or more leaf nodes associated with an intermediate node of the lowest intermediate level. The root node of a snapshot tree may include one or more pointers to one or more intermediate nodes. Each intermediate node may include one or more pointers to other nodes (e.g., a lower intermediate node or a leaf node). A leaf node may store file system metadata, metadata associated with a content file that is less than or equal to a limit size (e.g., 256 kB), data associated with a file (e.g., data fragment) that is less than or equal to smaller than the limit size, an identifier of a data brick, a pointer to a file metadata tree (e.g., Blob structure), or a pointer to a data chunk stored on the storage system. A leaf node may correspond to a data brick. The data brick may have a corresponding brick number.

The data associated with a content file that is smaller than or equal to a limit size may be stored in a leaf node of the snapshot tree. The data associated with a content file that is larger than the limit size may be stored across the one or more storage nodes 111, 113, 117. A file metadata tree may be generated for a content file that is larger than the limit size. The data of a content file may be divided into a plurality of bricks. A leaf node of a file metadata tree may correspond to one of the plurality of bricks. A leaf node of the file metadata tree may include a pointer to a storage location for the brick. In some embodiments, the size of a brick is 1 MB.

In some embodiments, the file metadata trees associated with a plurality of content files that are smaller than a threshold size may be combined into a combined metadata structure (e.g., a single file metadata tree). In some embodiments, data associated with a content file that is stored in a leaf node of a snapshot tree is removed from the leaf node and included in the combined metadata structure. After the file metadata trees associated with a plurality of content files are combined into a combined metadata structure file in storage, the view of the file system data corresponding to a backup snapshot may be updated. For example a leaf node of a snapshot tree that points to a file metadata tree corresponding to a content file included in the combined metadata structure may be updated. The leaf node of a snapshot tree may updated to point to the combined metadata structure instead of pointing to the file metadata tree corresponding to the content file. In some embodiments, the pointer of the leaf node indicates a portion of the combined metadata structure to which the leaf node points. In other embodiments, a metadata store indicates a portion of the combined file metadata tree to which the leaf node points. In some embodiments, the size of a first version of a content file is less than the threshold size and the metadata associated with the first version of the content file is combined with the metadata associated with one or more other content files into a combined metadata structure. The size of a second version of the content file may be greater than the threshold size. The metadata associated with the second version of the content file may be removed from the combined metadata structure.

The metadata store 114 may store the view of file system data corresponding to a backup snapshot. The metadata store may also store data associated with content files that are smaller than a limit size.

Each time a snapshot tree is generated, file system manager 115 may generate a plurality of combined metadata structures to be used for a plurality of small files. For example, a first snapshot tree may be associated with a first set of combined metadata structures and a second snapshot tree may be associated with a second set of combined metadata structures. The number of combined metadata structures generated by a storage system may be a pre-set number (e.g., 64). Each combined metadata tree may be configured to hold up to a threshold amount of metadata (e.g., 1 TB). The snapshot tree may include a leaf node that serves as a combined metadata structure reservation node. The combined metadata structure reservation node may store a data structure that includes information associated with the plurality of combined metadata structures for a particular snapshot tree. Such information may include the different offset ranges associated with a combined metadata structure, the available offset ranges, and whether a storage node of storage system 112 has reserved a particular offset range associated with the combined metadata structure.

In some embodiments, to modify a combined metadata structure, a storage node of storage system 112 is required to first obtain a lock on the combined metadata structure reservation node. The storage node of storage system 112 may request to modify a combined metadata structure (e.g., modify the metadata associated with an existing small file or store the metadata associated with a new small file). File system manager 115 may assign the requesting node to a random combined metadata structure of the available combined metadata structures. In other embodiments, the storage node of storage system 112 requests a particular combined metadata structure to update. In other embodiments, file system manager 115 may assign the requesting node to a combined metadata structure based on an assignment policy (e.g., round robin assignment, amount of storage available associated with a combined metadata structure, whether another node already has a lock on a combined metadata structure, etc.). The storage node of storage system 112 may reserve an offset range for the assigned combined metadata structure. Once a reservation is obtained, this may prevent one or more other storage nodes from attempting to modify the same offset range of the assigned combined metadata structure. In some embodiments, the offset range reservation is for a preset amount of storage (e.g., 64 GB). This may enable the storage node to write the metadata for a plurality of small files in the same write process. This may reduce the amount of overhead needed to modify/generate the metadata associated with a plurality of small files because instead of repeating the process of obtaining a lock for the combined metadata structure reservation node and reserving an offset range for each individual small file, the storage node may obtain a single instance of the lock for the combined metadata structure reservation node and reserve a single offset range for a plurality of files. The storage node of storage system 112 may release the lock for the combined metadata structure reservation node. This may allow one or more other storage nodes of storage system 112 to request to modify a combined metadata structure once the lock for the combined metadata structure reservation node is released.

Once the offset range for the particular combined metadata structure is reserved, the storage node of storage system 112 may obtain a lock (e.g., write lock) for the particular combined metadata structure. The storage node of storage system 112 may update the combined metadata structure when the lock is obtained. The storage node may update the particular combined metadata structure to include updated metadata associated with one or more existing small files or to include the metadata associated with one or more new small files. To update the metadata associated with an existing small file, file system manager 115 may clone the metadata associated with the existing small file and allow the storage node of storage system 112 to modify the cloned metadata data. This may reduce fragmentation on the underlying filesystem structure. After the writes for the plurality of small files are completed, the storage node of storage system 112 may release the lock for the particular combined metadata structure. This may allow one or more other storage nodes to access the particular combined metadata structure and update the particular combined metadata structure.

In other embodiments, to modify a combined metadata structure, a storage node of storage system 112 reads a combined metadata structure reservation node associated with a snapshot tree. The combined metadata structure reservation node may store a data structure that includes information associated with the plurality of combined metadata structures. Such information may include the different offset ranges associated with a combined metadata structure, the available offset ranges, and whether a node of a storage system has reserved a particular offset range associated with the combined metadata structure. A storage node of storage system 112 may attempt to obtain a lock for a combined metadata structure. The combined metadata structure may have an available offset range. A plurality of storage nodes of storage system 112 may be attempting to obtain the same lock for the combined metadata structure. The storage node of storage system 112 may be successful in obtaining the lock for the combined metadata structure. The storage node of storage system 112 may not be successful because another storage node of storage system 112 may have obtained the lock for the combined metadata structure. In the event the storage node of storage system 112 is able to obtain the lock for the combined metadata structure, the storage node of storage system 112 may reserve an offset range for the assigned combined metadata structure by updating the data structure of the combined metadata structure reservation node. Once a reservation is obtained, this may prevent one or more other storage nodes from attempting to modify the same offset range of the assigned combined metadata structure. The storage node may update the combined metadata structure for a plurality of small files. After the combined metadata structure is updated, the lock for the combined metadata structure may be released.

In some embodiments, a combined metadata structure may store a threshold amount of data. In the event a combined metadata structure stores the threshold amount of data, the combined metadata structure may become restricted. A restricted combined metadata structure is a combined metadata tree that is unable to be modified to include additional metadata. In the event a combined metadata structure is a restricted combined metadata structure, file system manager 115 may prevent a storage node from obtaining a write lock to modify the restricted combined metadata structure.

Each combined metadata structure may have an associated journal. The journal may store a plurality of entries for the small files associated with a combined metadata structure. Instead of individually updating the small files associated with the combined metadata structure, the journal may store the updates as journal entries, and batch update the small files associated with the combined metadata structure. This may reduce the amount of overhead in updating the metadata associated with a plurality of small files.

File system manager 115 may be configured to perform file maintenance. The file system manager may determine which content files of a backup snapshot and associated metadata to delete and which content files of a backup snapshot and associated metadata to keep. In some embodiments, a retention time policy condition is satisfied (e.g., a backup snapshot and associated view have been stored in storage for a particular amount of time) and file system manager 115 may determine that the backup snapshot and associated view are to be removed from storage. In the event the retention time policy condition has been satisfied, file system manager 115 may determine that the snapshot tree and associated file metadata trees are to be removed from storage. When removed, this reduces the storage needed to maintain the backup snapshot views because the data contained in the snapshot tree and file metadata trees associated with a backup snapshot view may not be needed after a certain amount of time has passed. File system manager 115 may use a reference count to determine which files associated with a backup snapshot and associated metadata to delete and which files associated with a backup snapshot and associated metadata to keep. The reference count indicates a number of backup snapshot views that reference a node included in a view. In some embodiments, each file metadata tree has an associated reference count. For example, a file metadata tree corresponds to metadata associated with a content file and a root node of the file metadata tree may be referenced by one or more views. In other embodiments, each portion of a file metadata tree corresponding to metadata associated with a content file has an associated reference count. For example, a file metadata tree may correspond to a plurality of content files. The metadata associated with a plurality of content files included in the combined file metadata tree may be referenced by different backup snapshot views. For example, the metadata associated with a first content file may be referenced by one backup snapshot while the metadata associated with a second content file may be referenced by two backup snapshots.

When a retention time policy condition is satisfied, file system manager 115 may determine the one or more content files associated with a backup snapshot and associated metadata are to be deleted by traversing the view of file system data corresponding to a backup snapshot to be deleted. A reference count associated with each of the identified files may be decremented. After the reference count for the files has been decremented, file system manager 115 may determine to delete content files and associated metadata with a reference count of "0" and to keep content files with a reference count that is greater than "0." After the content files and associated metadata have been deleted, file system manager 115 may update metadata store 114 to indicate storage ranges that are unused. In some embodiments, metadata associated with a content file that is part of a combined metadata structure file is deleted. File system manager 115 may update metadata store 114 to indicate that an offset range of the combined metadata structure is unused. In some embodiments, file system manager 115 may modify the combined metadata structure file such that the deleted portion of the combined metadata structure file is replaced with metadata associated with another content file.

Figure 2A:
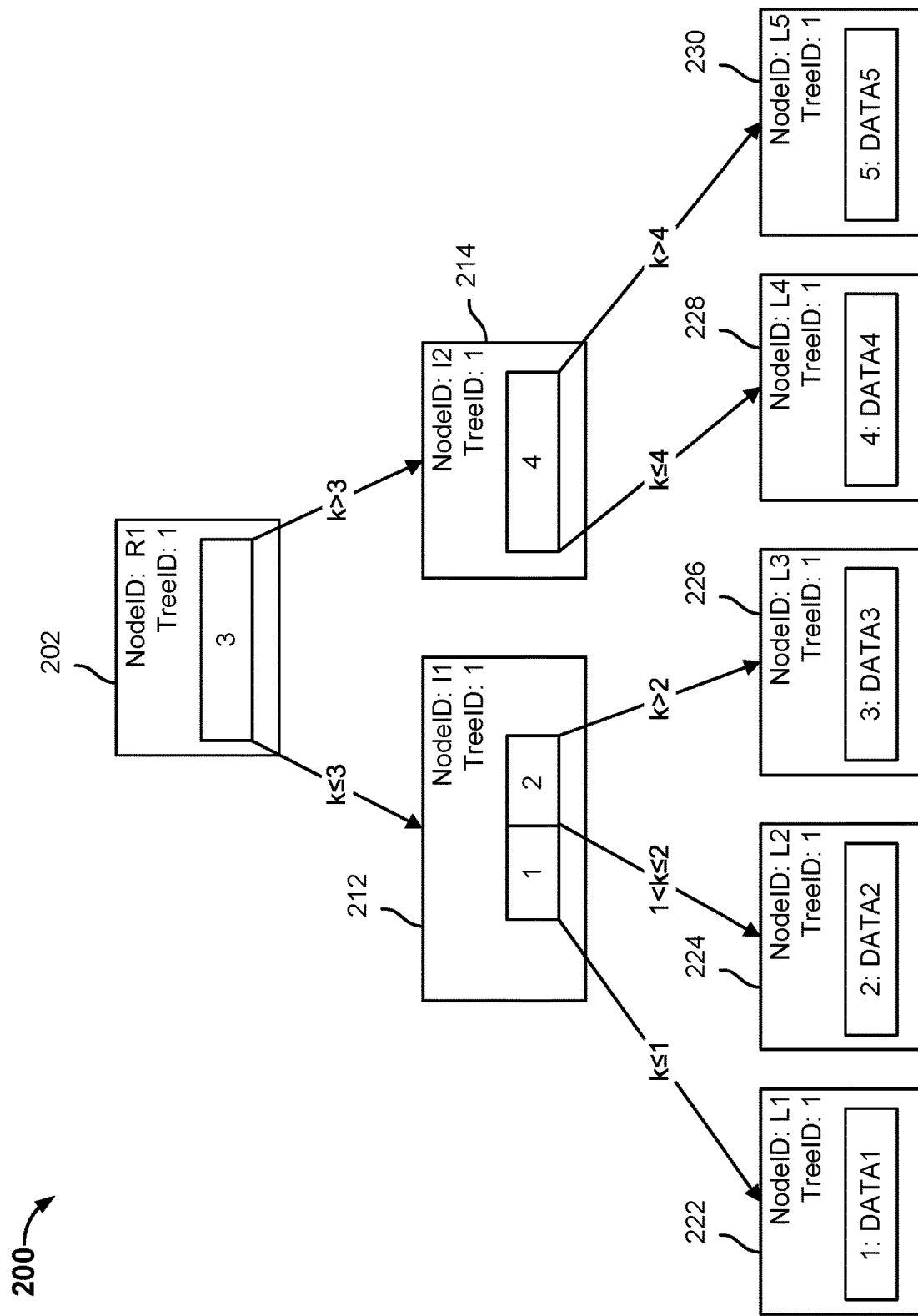
FIG. 2A is a block diagram illustrating an embodiment of a tree data structure.

FIG. 2A is a block diagram illustrating an embodiment of a tree data structure. A tree data structure may be used to represent the file system data that is stored on a storage system, such as storage system 112. The file system data may include metadata for a distributed file system and may include information, such as chunk identifier, chunk offset, file size, directory structure, file permissions, physical storage locations of the files, etc. A file system manager, such as file system manager 115, may generate tree data structure 200.

Tree data structure 200 is comprised of a snapshot tree that includes a root node 202, intermediate nodes 212, 214, and leaf nodes 222, 224, 226, 228, and 230. Although tree data structure 200 includes one intermediate level between root node 202 and leaf nodes 222, 224, 226, 228, 230, any number of intermediate levels may be implemented. Tree data structure 200 may correspond to a backup snapshot of file system data at a particular point in time t, for example at time to. The backup snapshot may be received from a primary system, such as primary system 102. The snapshot tree in conjunction with a plurality of file metadata trees may provide a complete view of the primary system associated with the backup snapshot for the particular point in time.

A root node is the starting point of a snapshot tree and may include pointers to one or more other nodes. An intermediate node is a node to which another node points (e.g., root node, other intermediate node) and includes one or more pointers to one or more other nodes. A leaf node is a node at the bottom of a snapshot tree. Each node of the tree structure includes a view identifier of a view with which the node is associated (e.g., TreeID).

A leaf node may be configured to store key-value pairs of file system data. A data key k is a lookup value by which a particular leaf node may be accessed. For example, "1" is a data key that may be used to look up "DATA1" of leaf node 222. The data key k may correspond to a brick number of a data brick. A data brick may be comprised of one or more data blocks. In some embodiments, the leaf node is configured to store file system metadata (e.g., chunk identifier (e.g., hash value, SHA-1, etc.), file size, directory structure, file permissions, physical storage locations of the files, etc.). A leaf node may store a data key k and a pointer to a location that stores the value associated with the data key.

In other embodiments, a leaf node is configured to store the actual data when the data associated with a content file is less than or equal to a limit size. For example, data associated with a content file that is less than or equal to 256 kB may reside in the leaf node of a snapshot tree. In some embodiments, a leaf node includes a pointer to a file metadata tree (e.g., blob structure) when the size of data associated with a content file is larger than the limit size.

A root node or an intermediate node may include one or more node keys. The node key may be an integer value or a non-integer value. Each node key indicates a division between the branches of the node and indicates how to traverse the tree structure to find a leaf node, i.e., which pointer to follow. For example, root node 202 may include a node key of "3." A data key k of a key-value pair that is less than or equal to the node key is associated with a first branch of the node and a data key k of a key-value pair that is greater than the node key is associated with a second branch of the node. In the above example, to find a leaf node storing a value associated with a data key of "1," "2," or "3," the first branch of root node 202 may be traversed to intermediate node 212 because the data keys of "1," "2", and "3" are less than or equal to the node key "3." To find a leaf node storing a value associated with a data key of "4" or "5," the second branch of root node 202 may be traversed to intermediate node 214 because data keys "4" and "5" are greater than the node key of "3."

A data key k of a key-value pair is not limited to a numerical value. In some embodiments, non-numerical data keys may be used for a data key-value pair (e.g., "name," "age", etc.) and a numerical number may be associated with the non-numerical data key. For example, a data key of "name" may correspond to a numerical key of "4." Data keys that alphabetically come before the word "name" or is the word "name" may be found following a left branch associated with a node. Data keys that alphabetically come after the word "name" may be found by following a right branch associated with the node. In some embodiments, a hash function may be associated with the non-numerical data key. The hash function may determine which branch of a node with which the non-numerical data key is associated. The hash function is applied to a data key to provide a hash. The hash may determine which branch of a node with which the non-numerical data key is associated.

In the example shown, root node 202 includes a pointer to intermediate node 212 and a pointer to intermediate node 214. Root node 202 includes a NodeID of "R1" and a TreeID of "1." The NodeID identifies the name of the node. The TreeID identifies the view with which the node is associated. When a change is made to data stored in a leaf node as described with respect to FIGS. 2B, 2C, and 2D, the TreeID is used to determine whether a copy of a node is to be made.

Root node 202 includes a node key that divides a set of pointers into two different subsets. Leaf nodes (e.g., "1-3") with a data key k that is less than or equal to the node key are associated with a first branch and leaf nodes (e.g., "4-5") with a data key k that is greater than the node key are associated with a second branch. Leaf nodes with a data key of "1," "2," or "3" may be found by traversing tree data structure 200 from root node 202 to intermediate node 212 because the data keys have a value that is less than or equal to the node key. Leaf nodes with a data key of "4" or "5" may be found by traversing tree data structure 200 from root node 202 to intermediate node 214 because the data keys have a value that is greater than the node key.

Root node 202 includes a first set of pointers. The first set of pointers associated with a data key less than the node key (e.g., "1", "2," or "3") indicates that traversing tree data structure 200 from root node 202 to intermediate node 212 may lead to a leaf node with a data key of "1," "2," or "3." Intermediate node 214 includes a second set of pointers. The second set of pointers associated with a data key greater than the node key indicates that traversing tree data structure 200 from root node 202 to intermediate node 214 may lead to a leaf node with a data key of "4" or "5."

Intermediate node 212 includes a pointer to leaf node 222, a pointer to leaf node 224, and a pointer to leaf node 226. Intermediate node 212 includes a NodeID of "I1" and a TreeID of "1." Intermediate node 212 includes a first node key of "1" and a second node key of "2." The data key k for leaf node 222 is a value that is less than or equal to the first node key. The data key k for leaf node 224 is a value that is greater than the first node key and less than or equal to the second node key. The data key k for leaf node 226 is a value that is greater than the second node key. The pointer to leaf node 222 indicates that traversing tree data structure 200 from intermediate node 212 to leaf node 222 may lead to the node with a data key of "1." The pointer to leaf node 224 indicates that traversing tree data structure 200 from intermediate node 212 to leaf node 224 may lead to the node with a data key of "2." The pointer to leaf node 226 indicates that traversing tree data structure 200 from intermediate node 212 to leaf node 226 may lead to the node with a data key of "3."

Intermediate node 214 includes a pointer to leaf node 228 and a pointer to leaf node 230. Intermediate node 212 includes a NodeID of "I2" and a TreeID of "1." Intermediate node 214 includes a node key of "4." The data key k for leaf node 228 is a value that is less than or equal to the node key. The data key k for leaf node 230 is a value that is greater than the node key. The pointer to leaf node 228 indicates that traversing tree data structure 200 from intermediate node 214 to leaf node 228 may lead to the node with a data key of "4." The pointer to leaf node 230 indicates that traversing tree data structure 200 from intermediate node 214 to leaf node 230 may lead to the node with a data key of "5."

Leaf node 222 includes a data key-value pair of "1: DATA1." Leaf node 222 includes NodeID of "L1" and a TreeID of "1." To view the value associated with a data key of "1," tree data structure 200 is traversed from root node 202 to intermediate node 212 to leaf node 222. In some embodiments, leaf node 222 is configured to store metadata associated with a content file. In other embodiments, leaf node 222 is configured to store a pointer to a file metadata tree (e.g., blob structure).

Leaf node 224 includes a data key-value pair of "2: DATA2." Leaf node 224 includes NodeID of "L2" and a TreeID of "1." To view the value associated with a data key of "2," tree data structure 200 is traversed from root node 202 to intermediate node 212 to leaf node 224. In some embodiments, leaf node 224 is configured to store metadata associated with a content file. In other embodiments, leaf node 224 is configured to store a pointer to a file metadata tree (e.g., blob structure).

Leaf node 226 includes a data key-value pair of "3: DATA3." Leaf node 226 includes NodeID of "L3" and a TreeID of "1." To view the value associated with a data key of "3," tree data structure 200 is traversed from root node 202 to intermediate node 212 to leaf node 226. In some embodiments, leaf node 226 is configured to store metadata associated with a content file. In other embodiments, leaf node 226 is configured to store a pointer to a file metadata tree (e.g., blob structure).

Leaf node 228 includes a data key-value pair of "4: DATA4." Leaf node 228 includes NodeID of "L4" and a TreeID of "1." To view the value associated with a data key of "4," tree data structure 200 is traversed from root node 202 to intermediate node 214 to leaf node 228. In some embodiments, leaf node 228 is configured to store metadata associated with a content file. In other embodiments, leaf node 228 is configured to store a pointer to a file metadata tree (e.g., blob structure).

Leaf node 230 includes a data key-value pair of "5: DATA5." Leaf node 230 includes NodeID of "L5" and a TreeID of "1." To view the value associated with a data key of "5," tree data structure 200 is traversed from root node 202 to intermediate node 214 to leaf node 230. In some embodiments, leaf node 230 is configured to store metadata associated with a content file. In other embodiments, leaf node 230 is configured to store a pointer to a file metadata tree (e.g., blob structure).

In some embodiments, a leaf node stores a reference to a combined metadata structure. For example, leaf nodes 222, 224, 226, 228, or 230 may include a reference to a combined metadata structure. A storage node may be required to obtain a lock to update a combined metadata structure.

In some embodiments, a leaf node is a combined metadata structure reservation node. The combined metadata structure reservation node may store a data structure that includes information associated with the plurality of combined metadata structures. Such information may include the different offset ranges associated with a combined metadata structure, the available offset ranges, and whether a node of a storage system has reserved a particular offset range associated with the combined metadata structure. Leaf nodes 222, 224, 226, 228, or 230 may be a combined metadata structure reservation node and include a data structure that includes information associated with information associated with the plurality of combined metadata structures for a particular snapshot tree. A storage node may be required to obtain a lock to update the combined metadata structure reservation node.

Figure 2B:
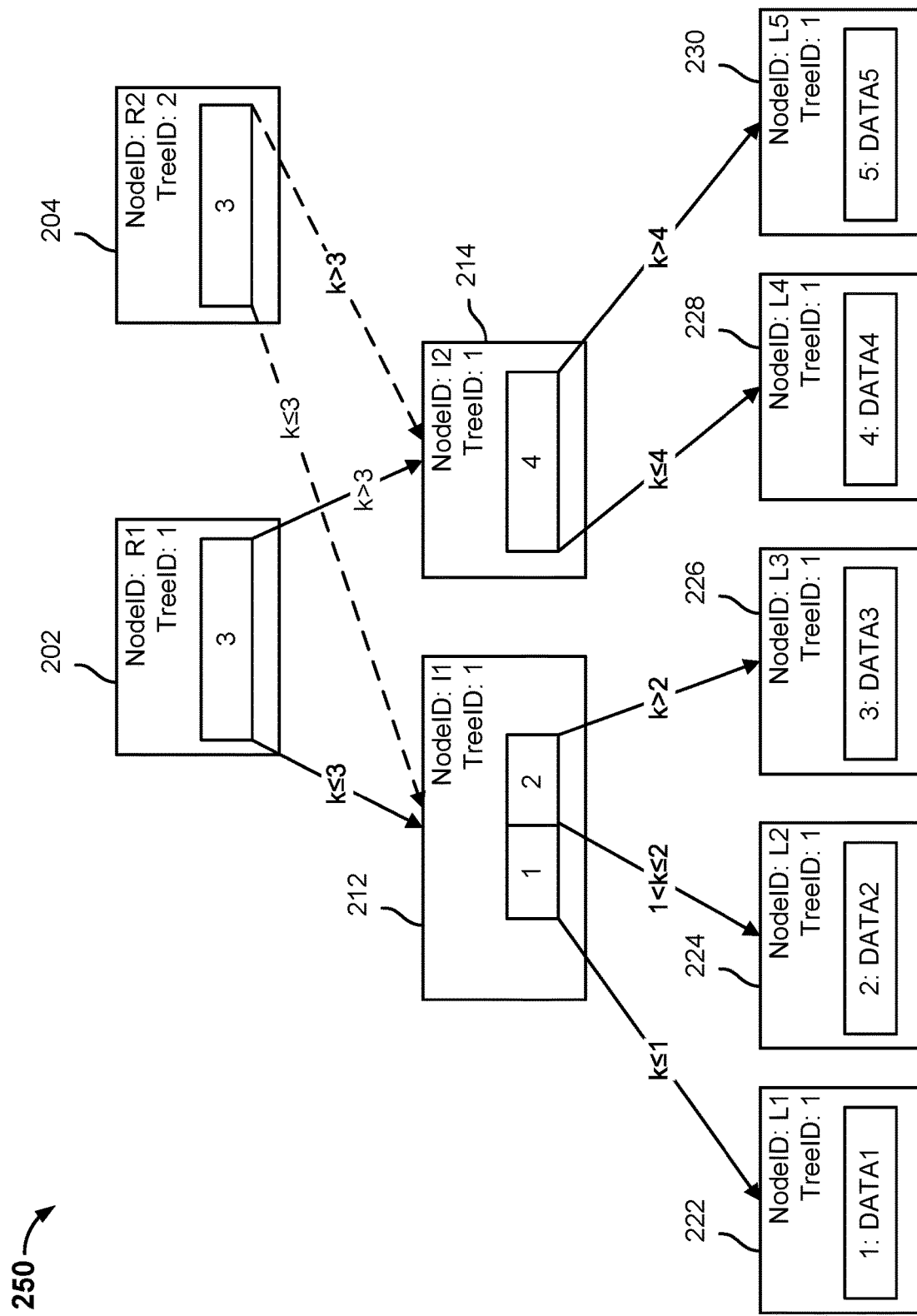
FIG. 2B is a block diagram illustrating an embodiment of a cloned snapshot tree.

FIG. 2B is a block diagram illustrating an embodiment of a cloned snapshot tree. A snapshot tree may be cloned when a snapshot tree is added to a tree data structure. In some embodiments, tree data structure 250 may be created by a storage system, such as storage system 112. The file system data of a primary system, such as primary system 102, may be backed up to a storage system, such as storage system 112. A subsequent backup snapshot may correspond to a full backup snapshot or an incremental backup snapshot. The manner in which the file system data corresponding to the subsequent backup snapshot is stored in storage system 112 may be represented by a tree data structure. The tree data structure corresponding to the subsequent backup snapshot is created by cloning a snapshot tree associated with a last backup.

In the example shown, tree data structure 250 includes root nodes 202, 204, intermediate nodes 212, 214, and leaf nodes 222, 224, 226, 228, and 230. Tree data structure 250 may be a snapshot of file system data at a particular point in time t+n. The tree data structure can be used to capture different versions of file system data at different moments in time. The tree data structure may also efficiently locate desired metadata by traversing a particular version of a snapshot tree included in the tree data structure. In some embodiments, the tree data structure allows a chain of backup snapshot versions (i.e., snapshot trees) to be linked together by allowing a node of a later version of a snapshot tree to reference a node of a previous version of a snapshot tree. For example, a snapshot tree with root node 204 is linked to a snapshot tree with root node 202. Each time a snapshot is performed, a new root node may be created and the new root node includes the same set of pointers included in the previous root node, that is, the new root node of the snapshot may be linked to one or more intermediate nodes associated with a previous snapshot. The new root node also includes a different NodeID and a different TreeID. The TreeID is the view identifier associated with a view of the primary system associated with the backup snapshot for the particular moment in time.

In some embodiments, a root node is associated with a current view of the file system data. A current view may still accept one or more changes to the data. The TreeID of a root node indicates a snapshot with which the root node is associated. For example, root node 202 with a TreeID of "1" is associated with a first backup snapshot and root node 204 with a TreeID of "2" is associated with a second backup snapshot. In the example shown, root node 204 is associated with a current view of the file system data.

In other embodiments, a root node is associated with a snapshot view of the file system data. A snapshot view may represent a state of the file system data at a particular moment in time in the past and is not updated. In the example shown, root node 202 is associated with a snapshot view of the file system data.

In some embodiments, to create a snapshot of the file system at time t+n, two new root nodes are created. Providing two new root nodes, each with a different TreeID, prevents updates made to a particular view (e.g., current view) from affecting nodes of a different view (e.g., snapshot view). One of the new root nodes may be associated with a current view (i.e., modifiable) and the other new root node may be associated with a snapshot view (i.e., not modifiable). In some embodiments, a root node associated with a previous snapshot view is removed from the snapshot tree after a backup snapshot is performed (e.g., root node 202 is removed after root node 204 is added).

In the example shown, root node 204 is a copy of root node 202. Similar to root node 202, root node 204 includes the same pointers as root node 202. Root node 204 includes a first set of pointers to intermediate node 212. The first set of pointers associated with a data key k less than or equal to the node key (e.g., "1," "2," or "3") indicates that traversing tree data structure 250 from root node 204 to intermediate node 212 may lead to a leaf node with a data key of "1," "2," or "3." Root node 204 includes a second set of pointers to intermediate node 214. The second set of pointers associated with a data key k greater than the node key indicates that traversing tree data structure 250 from root node 204 to intermediate node 214 may lead to a leaf node with a data key of "4" or "5." Root node 204 includes a NodeID of "R2" and a TreeID of "2." The NodeID identifies the name of the node. The TreeID identifies the backup snapshot with which the node is associated.

Figure 2C:
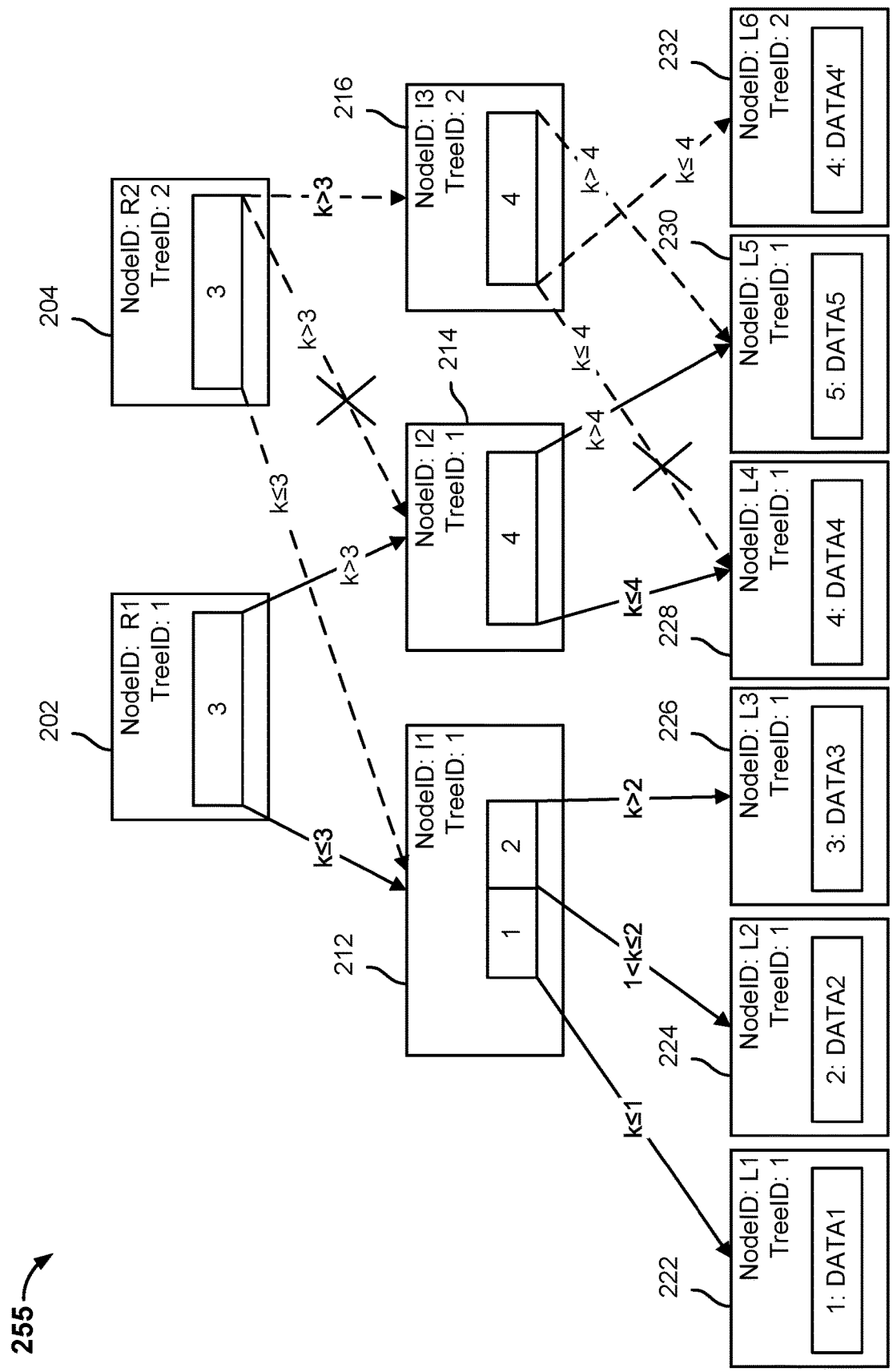
FIG. 2C is a block diagram illustrating an embodiment of modifying a cloned snapshot tree.

FIG. 2C is a block diagram illustrating an embodiment of modifying a cloned snapshot tree. In the example shown, tree data structure 255 may be modified by a file system manager, such as file system manager 115. A snapshot tree with a root node 204 may be a current view of the file system data at time t+n+m, for example, at time $t_2$. A current view represents a state of the file system data that is up-to-date and capable of receiving one or more modifications to the snapshot tree that correspond to modifications to the file system data. Because a snapshot represents a perspective of the file system data that is "frozen" in time, one or more copies of one or more nodes affected by a change to file system data are made.

In the example shown, the value "DATA4" has been modified to be "DATA4'." In some embodiments, the value of a key value pair has been modified. In other embodiments, the value of the key value pair is the data associated with a content file that is smaller than or equal to a limit size. In other embodiments, the value of the key value pair points to a different file metadata tree. The different file metadata tree may be a modified version of the file metadata tree that the leaf node previously pointed to.

At $t_2$, the file system manager starts at root node 204 because that is the root node associated with snapshot tree at time $t_2$ (i.e., the root node associated with the last backup snapshot). The value "DATA4" is associated with the data key "4." The file system manager traverses snapshot tree 255 from root node 204 until it reaches a target node, in this example, leaf node 228. The file system manager compares the TreeID at each intermediate node and leaf node with the TreeID of the root node. In the event the TreeID of a node matches the TreeID of the root node, the file system manager proceeds to the next node. In the event the TreeID of a node does not match the TreeID of the root node, a shadow copy of the node with the non-matching TreeID is made (e.g., a node copy that includes the same pointers as the copied node, but includes a different NodeID and a different TreeID). For example, to reach a leaf node with a data key of "4," the file system manager begins at root node 204 and proceeds to intermediate node 214. The file system manager compares the TreeID of intermediate node 214 with the TreeID of root node 204, determines that the TreeID of intermediate node 214 does not match the TreeID of root node 204, and creates a copy of intermediate node 214. The intermediate node copy 216 includes the same set of pointers as intermediate node 214, but includes a TreeID of "2" to match the TreeID of root node 204. The file system manager updates a pointer of root node 204 to point to intermediate node 216 instead of pointing to intermediate node 214. The file system manager traverses tree data structure 255 from intermediate node 216 to leaf node 228, determines that the TreeID of leaf node 228 does not match the TreeID of root node 204, and creates a copy of leaf node 228. Leaf node copy 232 stores the modified value "DATA4'" and includes the same TreeID as root node 204. The file system manager updates a pointer of intermediate node 216 to point to leaf node 232 instead of pointing to leaf node 228.

In some embodiments, leaf node 232 stores the value of a key value pair that has been modified. In other embodiments, leaf node 232 stores the modified data associated with a content file that is smaller than or equal to a limit size. In other embodiments, leaf node 232 stores a pointer to a file metadata tree corresponding to the modified file that is less than or equal to a threshold size. In other embodiments, leaf node 232 stores a pointer to a file metadata tree corresponding to the modified file that is greater than a threshold size.

Figure 2D:
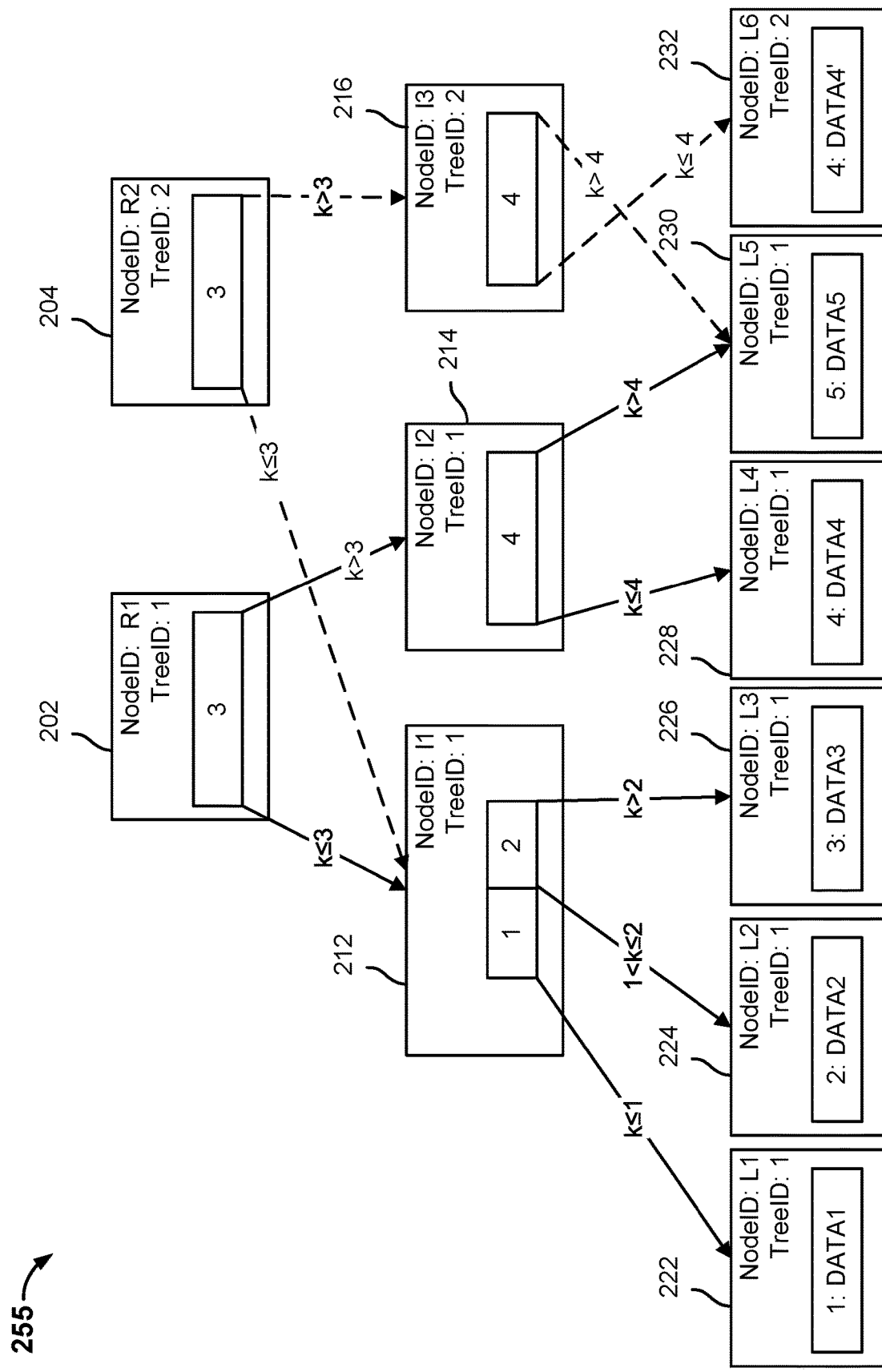
FIG. 2D is a block diagram illustrating an embodiment of a modified cloned snapshot tree.

FIG. 2D is a block diagram illustrating an embodiment of a modified cloned snapshot tree. Tree data structure 255 shown in FIG. 2D illustrates a result of the modifications made to a snapshot tree as described with respect to FIG. 2C.

Figure 3A:
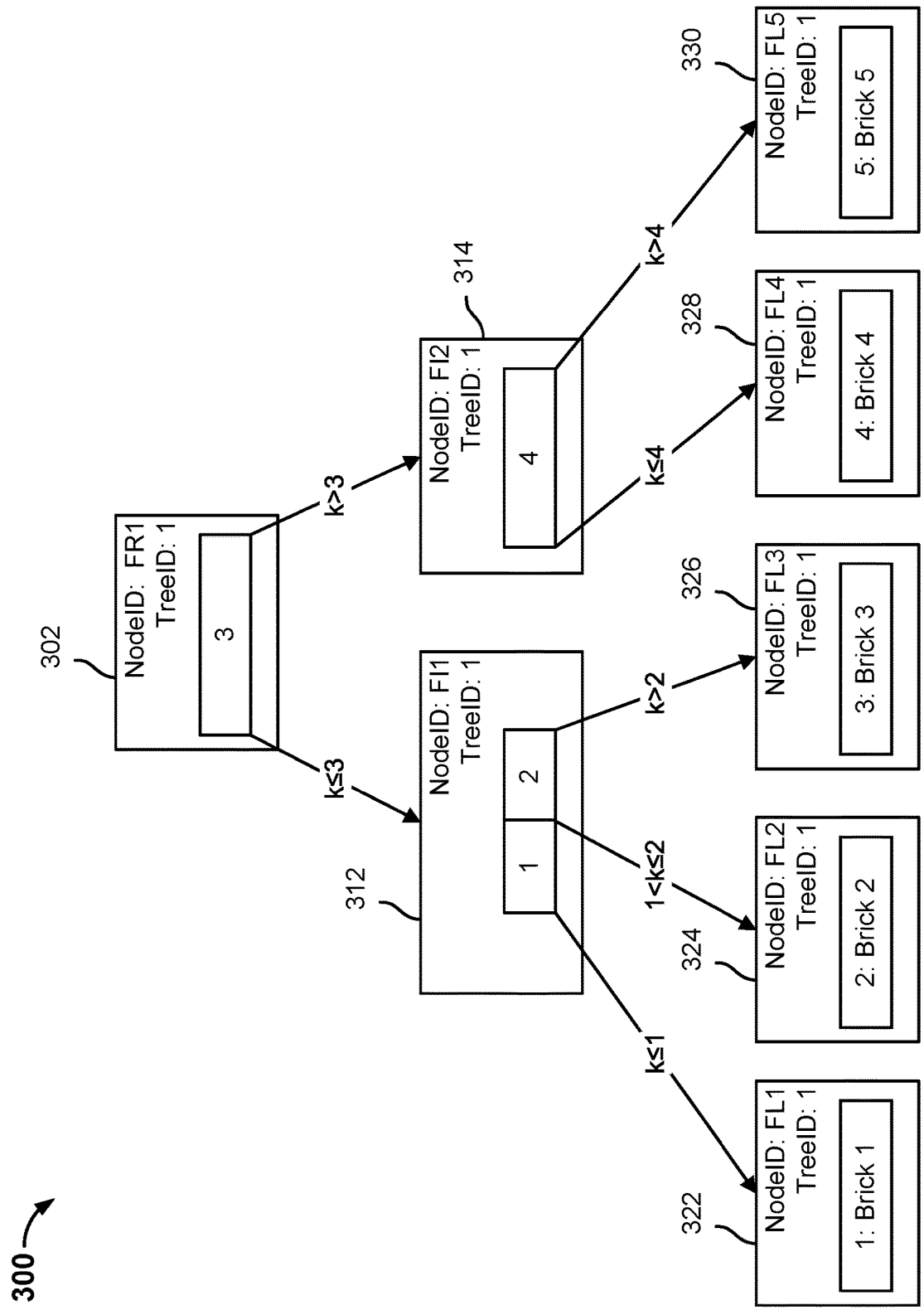
FIG. 3A is a block diagram illustrating an embodiment of a tree data structure.

FIG. 3A is a block diagram illustrating an embodiment of a tree data structure. In some embodiments, tree data structure 300 may be created by a storage system, such as storage system 112. In the example shown, tree data structure 300 corresponds to a content file and stores the metadata associated with the content file. The metadata associated with a content file is stored by a storage system as a file separate from the content file with which the metadata is associated, that is, the tree data structure is stored separately from a content file. A leaf node of a snapshot tree associated with file system data, such as a leaf node of tree data structures 200, 250, 255, may include a pointer to a tree data structure corresponding to a file, such as tree data structure 300. A tree data structure corresponding to a content file (i.e., a "file metadata tree") is a snapshot tree, but is used to organize the data blocks associated with a content file that are stored on the storage system. Tree data structure 300 may be referred to as a "file metadata tree" or a "file metadata structure."

A tree data structure corresponding to a content file at a particular point in time (e.g., a particular version) may be comprised of a root node, one or more levels of one or more intermediate nodes, and one or more leaf nodes. In some embodiments, a tree data structure corresponding to a content file is comprised of a root node and one or more leaf nodes without any intermediate nodes. Tree data structure 300 may be a snapshot of a content file at a particular point in time t, for example at time to. A tree data structure associated with file system data may include one or more pointers to one or more tree data structures corresponding to one or more content files.

In the example shown, tree data structure 300 includes a file root node 302, file intermediate nodes 312, 314, and file leaf nodes 322, 324, 326, 328, 330. Although tree data structure 300 includes one intermediate level between root node 302 and leaf nodes 322, 324, 326, 328, 330, any number of intermediate levels may be implemented. Similar of the snapshot trees described above, each node includes a "NodeID" that identifies the node and a "TreeID" that identifies a view with which the node is associated.

In the example shown, root node 302 includes a pointer to intermediate node 312 and a pointer to intermediate node 314. Root node 302 includes a NodeID of "FR1" and a TreeID of "1." The NodeID identifies the name of the node. The TreeID identifies the snapshot/view with which the node is associated.

In the example shown, intermediate node 312 includes a pointer to leaf node 322, a pointer to leaf node 324, and a pointer to leaf node 326. Intermediate node 312 includes a NodeID of "FI1" and a TreeID of "1." Intermediate node 312 includes a first node key and a second node key. The data key k for leaf node 322 is a value that is less than or equal to the first node key. The data key for leaf node 324 is a value that is greater than the first node key and less than or equal to the second node key. The data key for leaf node 326 is a value that is greater than the second node key. The pointer to leaf node 322 indicates that traversing tree data structure 300 from intermediate node 312 to leaf node 322 may lead to the node with a data key of "1." The pointer to leaf node 324 indicates that traversing tree data structure 300 from intermediate node 312 to leaf node 324 may lead to the node with a data key of "2." The pointer to leaf node 326 indicates that traversing tree data structure 300 from intermediate node 312 to leaf node 326 may lead to the node with a data key of "3."

In the example shown, intermediate node 314 includes a pointer to leaf node 328 and a pointer to leaf node 330. Intermediate node 314 includes a NodeID of "FI2" and a TreeID of "1." Intermediate node 314 includes a node key. The data key k for leaf node 328 is a value that is less than or equal to the node key. The data key for leaf node 330 is a value that is greater than the node key. The pointer to leaf node 328 indicates that traversing tree data structure 300 from intermediate node 314 to leaf node 328 may lead to the node with a data key of "4." The pointer to leaf node 330 indicates that traversing tree data structure 300 from intermediate node 314 to leaf node 330 may lead to the node with a data key of "5."

Leaf node 322 includes a data key-value pair of "1: Brick 1." "Brick 1" is a brick identifier that identifies the data brick storing one or more data chunks associated with a content file corresponding to tree data structure 300. Leaf node 322 includes NodeID of "FL1" and a TreeID of "1." To view the value associated with a data key of "1," tree data structure 300 is traversed from root node 302 to intermediate node 312 to leaf node 322.

Leaf node 324 includes a data key-value pair of "2: Brick 2." "Brick 2" is a brick identifier that identifies the data brick storing one or more data chunks associated with a content file corresponding to tree data structure 300. Leaf node 324 includes NodeID of "FL2" and a TreeID of "1." To view the value associated with a data key of "2," tree data structure 300 is traversed from root node 302 to intermediate node 312 to leaf node 324.

Leaf node 326 includes a data key-value pair of "3: Brick 3." "Brick 3" is a brick identifier that identifies the data brick storing one or more data chunks associated with a content file corresponding to tree data structure 300. Leaf node 326 includes NodeID of "FL3" and a TreeID of "1." To view the value associated with a data key of "3," tree data structure 300 is traversed from root node 302 to intermediate node 312 to leaf node 326.

Leaf node 328 includes a data key-value pair of "4: Brick 4." "Brick 4" is a brick identifier that identifies the data brick storing one or more data chunks associated with a content file corresponding to tree data structure 300. Leaf node 328 includes NodeID of "FL4" and a TreeID of "1." To view the value associated with a data key of "4," tree data structure 300 is traversed from root node 302 to intermediate node 314 to leaf node 328.

Leaf node 330 includes a data key-value pair of "5: Brick 5." "Brick 5" is a brick identifier that identifies the data brick storing one or more data chunks associated with a content file corresponding to tree data structure 300. Leaf node 330 includes NodeID of "FL5" and a TreeID of "1." To view the value associated with a data key of "5," tree data structure 300 is traversed from root node 302 to intermediate node 314 to leaf node 330.

A content file may be comprised of a plurality of data chunks. A brick may store one or more data chunks. In the example shown, leaf nodes 322, 324, 326, 328, 330 each store a corresponding brick identifier. A metadata store may include a data structure that matches a brick identifier with a corresponding location (physical location) of the one or more data chunks comprising the brick.

Figure 3B:
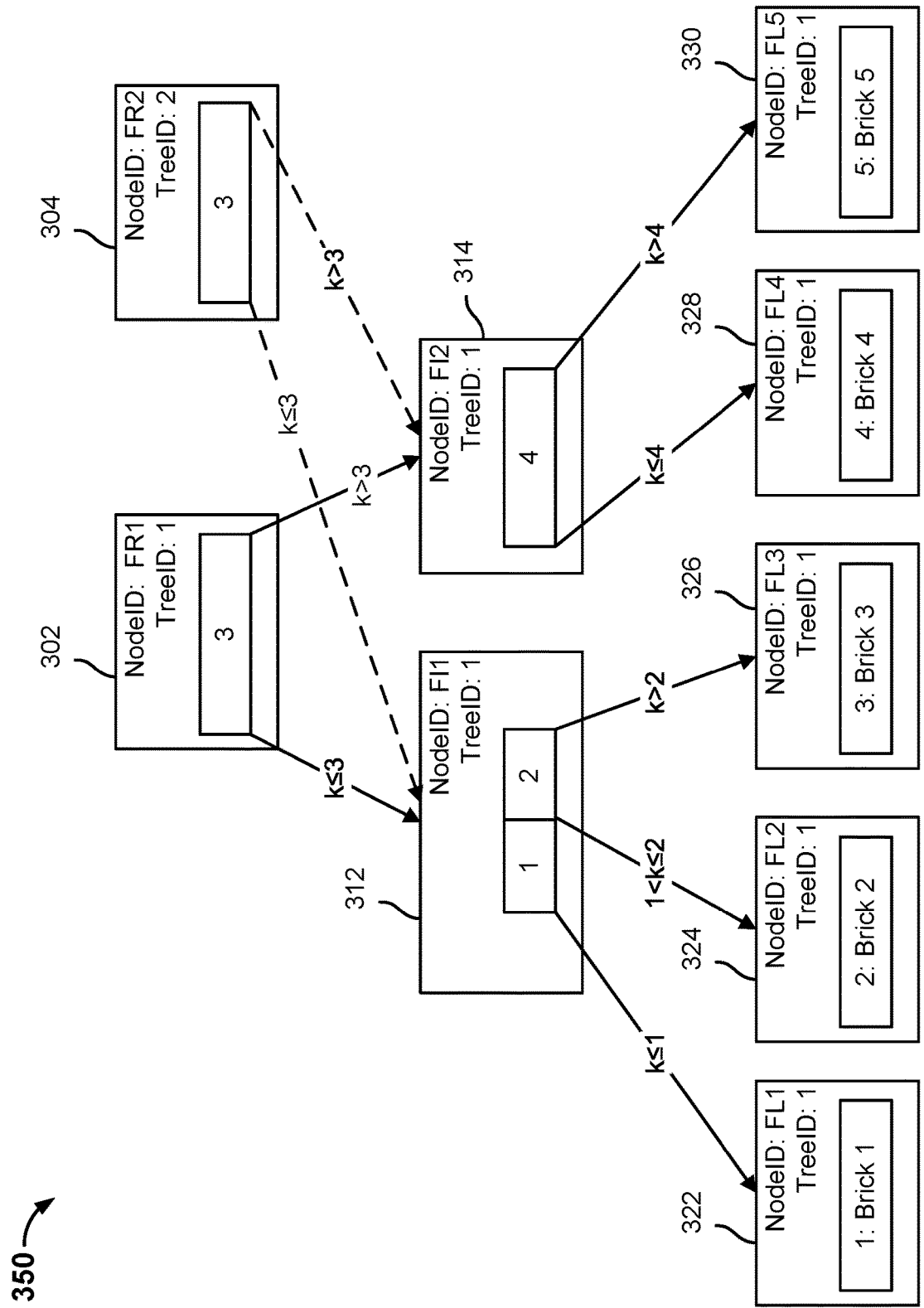
FIG. 3B is a block diagram illustrating an embodiment of cloning a file metadata tree.

FIG. 3B is a block diagram illustrating an embodiment of cloning a file metadata tree. In some embodiments, tree data structure 350 may be created by a storage system, such as storage system 112. A tree data structure corresponding to a content file is a snapshot tree, but stores metadata associated with the content file. The tree data structure corresponding to a content file can be used to capture different versions of the content file at different moments in time. In some embodiments, the tree data structure allows a chain of file metadata trees corresponding to different versions of a content file to be linked together by allowing a node of a later version of a file metadata tree to reference a node of a previous version of a file metadata tree. A file metadata tree is comprised of a root node, one or more levels of one or more intermediate nodes, and one or more leaf nodes.

A root node or an intermediate node of a version of a file metadata tree may reference an intermediate node or a leaf node of a previous version of a file metadata tree. Similar to the snapshot tree structure, the file metadata tree structure allows different versions of file data to share nodes and allows changes to a content file to be tracked. When a backup snapshot is received, a root node of the file metadata tree may be linked to one or more intermediate nodes associated with a previous file metadata tree. This may occur when the file is included in both backup snapshots.

In the example shown, tree data structure 350 includes a file metadata tree comprising root node 302, intermediate nodes 312, 314, and leaf nodes 322, 324, 326, 328, and 330. Tree data structure 350 also includes a second file metadata tree that may be a snapshot of file data at a particular point in time t+n, for example at time $t_1$. The second file metadata tree is comprised of root node 304, intermediate nodes 312, 314, and leaf nodes 322, 324, 326, 328, and 330. To create a snapshot of the file data at time t+n, a new root node is created. The new root node includes the same set of pointers as the original node. In the example shown, root node 304 includes a set of pointers to intermediate nodes 312, 314, which are intermediate nodes associated with a previous snapshot. The new root node also includes a different NodeID and a different TreeID. The TreeID is the view identifier associated with a view of the file metadata tree at a particular moment in time. In some embodiments, root node 304 is associated with a current view of the file data. The current view may represent a state of the file data that is up-to-date and is capable of receiving one or more modifications to the file metadata tree that correspond to modifications to the file data. The TreeID of a root node indicates a snapshot with which the root node is associated. For example, root node 302 with a TreeID of "1" is associated with a first backup snapshot and root node 304 with a TreeID of "2" is associated with a second backup snapshot. In other embodiments, root node 304 is associated with a snapshot view of the file data. A snapshot view may represent a state of the file data at a particular moment in time in the past and is not updated.

In some embodiments, to create a snapshot of the file data at time t+n, two new root nodes are created. Providing two new root nodes, each with a different TreeID, prevents updates made to a particular view (e.g., current view) from affecting nodes of a different view (e.g., snapshot view). One of the new root nodes may be associated with a current view (i.e., modifiable) and the other new root node may be associated with a snapshot view (i.e., not modifiable).

In the example shown, root node 304 is a copy of root node 302. Similar to root node 302, root node 304 includes the same pointers as root node 302. Root node 304 includes a first set of pointers to intermediate node 312. The first set of pointers associated with a data key (e.g., "1," "2," or "3") less than or equal to the node key indicates that traversing a file metadata tree included in tree data structure 350 from root node 304 to intermediate node 312 may lead to a leaf node with a data key of "1," "2," or "3." Root node 304 includes a second set of pointers to intermediate node 314. The second set of pointers associated with a data key greater than the node key indicates that traversing a file metadata tree included in tree data structure 350 from root node 304 to intermediate node 314 may lead to a leaf node with a data key of "4" or "5." Root node 304 includes a NodeID of "FR2" and a TreeID of "2." The NodeID identifies the name of the node. The TreeID identifies the backup snapshot with which the node is associated.

Figure 3C:
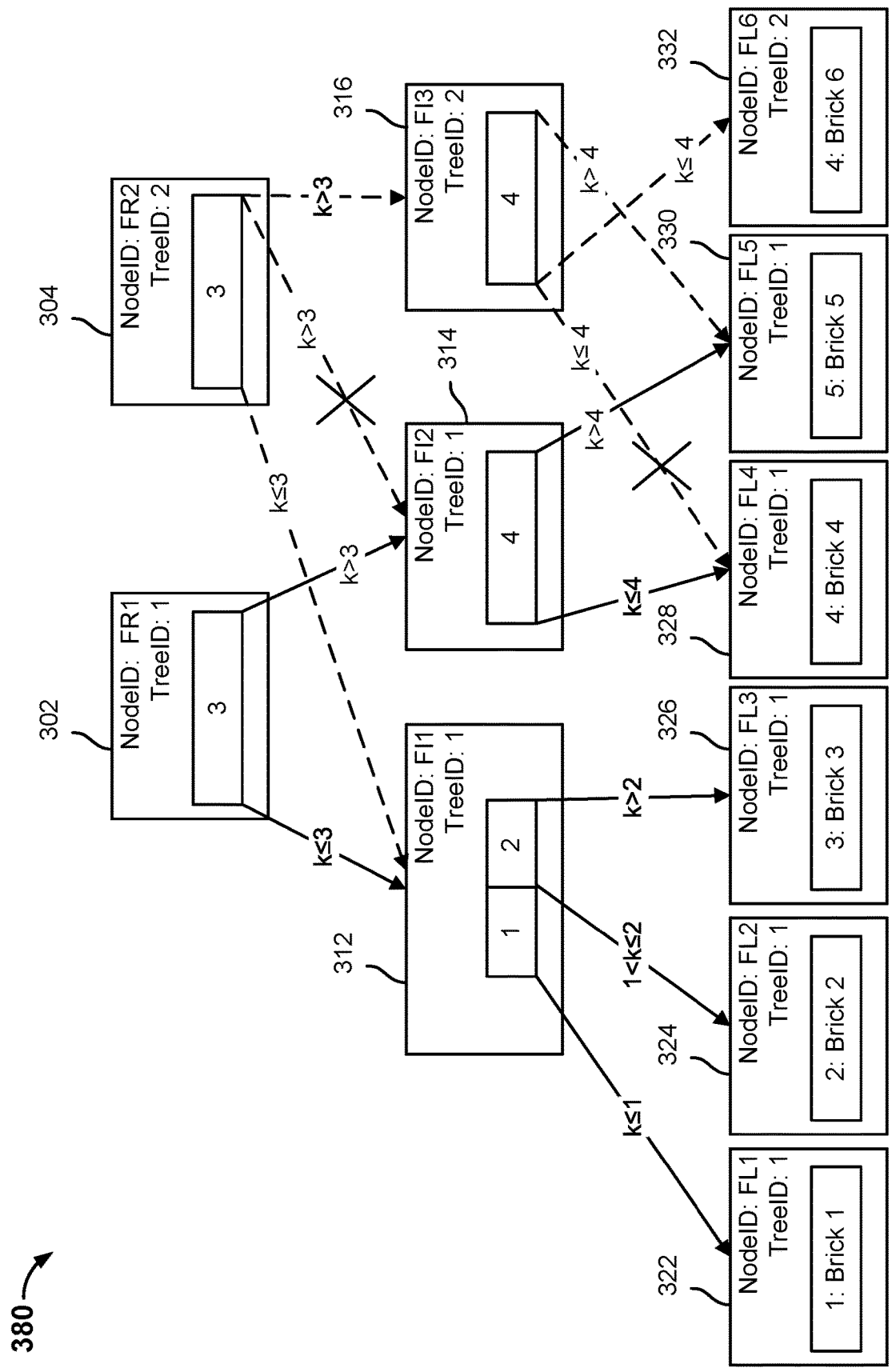
FIG. 3C is a block diagram illustrating an embodiment of modifying a cloned file metadata tree.

FIG. 3C is a block diagram illustrating an embodiment of modifying a cloned file metadata tree. In the example shown, tree data structure 380 may be modified by a file system manager, such as file system manager 115. A file metadata tree with root node 304 may be a current view of the file data at time t+n+m, for example, at time $t_2$. A current view may represent a state of the file data that is up-to-date and capable of receiving one or more modifications to the file metadata tree that correspond to modifications to the file system data. Because a snapshot represents a perspective of the file data that is "frozen" in time, one or more copies of one or more nodes affected by a change to file data are made.

In some embodiments, the file data may be modified such that one of the data chunks is replaced by another data chunk. When a data chunk of file data associated with a previous backup snapshot is replaced with a new data chunk, the data brick storing the data chunk may be different. A leaf node of a file metadata tree stores a brick identifier associated with a particular brick storing the data chunk. To represent this modification to the file data, a corresponding modification is made to a current view of a file metadata tree. The current view of the file metadata tree is modified because the previous file metadata tree is a snapshot view and can no longer be modified. The data chunk of the file data that was replaced has a corresponding leaf node in the previous file metadata tree. A new leaf node in the current view of the file metadata tree is created, as described herein, that corresponds to the new data chunk. The new leaf node includes an identifier associated with the current view. The new leaf node may also store the chunk identifier associated with the modified data chunk.

In the example shown, a data chunk included in "Brick 4" has been modified. The data chunk included in "Brick 4" has been replaced with a data chunk included in "Brick 6." At $t_2$, the file system manager starts at root node 304 because that is the root node associated with the file metadata tree at time $t_2$. The value "Brick 4" is associated with the data key "4." The file system manager traverses tree data structure 380 from root node 304 until it reaches a target node, in this example, leaf node 328. The file system manager compares the TreeID at each intermediate node and leaf node with the TreeID of the root node. In the event the TreeID of a node matches the TreeID of the root node, the file system manager proceeds to the next node. In the event the TreeID of a node does not match the TreeID of the root node, a shadow copy of the node with the non-matching TreeID is made. For example, to reach a leaf node with a data key of "4," the file system manager begins at root node 304 and proceeds to intermediate node 314. The file system manager compares the TreeID of intermediate node 314 with the TreeID of root node 304, determines that the TreeID of intermediate node 314 does not match the TreeID of root node 304, and creates a copy of intermediate node 314. The intermediate node copy 316 includes the same set of pointers as intermediate node 314, but includes a TreeID of "2" to match the TreeID of root node 304. The file system manager updates a pointer of root node 304 to point to intermediate node 316 instead of pointing to intermediate node 314. The file system manager traverses tree data structure 380 from intermediate node 316 to leaf node 328, determines that the TreeID of leaf node 328 does not match the TreeID of root node 304, and creates a copy of leaf node 328. Leaf node 332 is a copy of leaf node 328, but stores the brick identifier "Brick 6" and includes the same TreeID as root node 304. The file system manager updates a pointer of intermediate node 316 to point to leaf node 332 instead of pointing to leaf node 328.

Figure 3D:
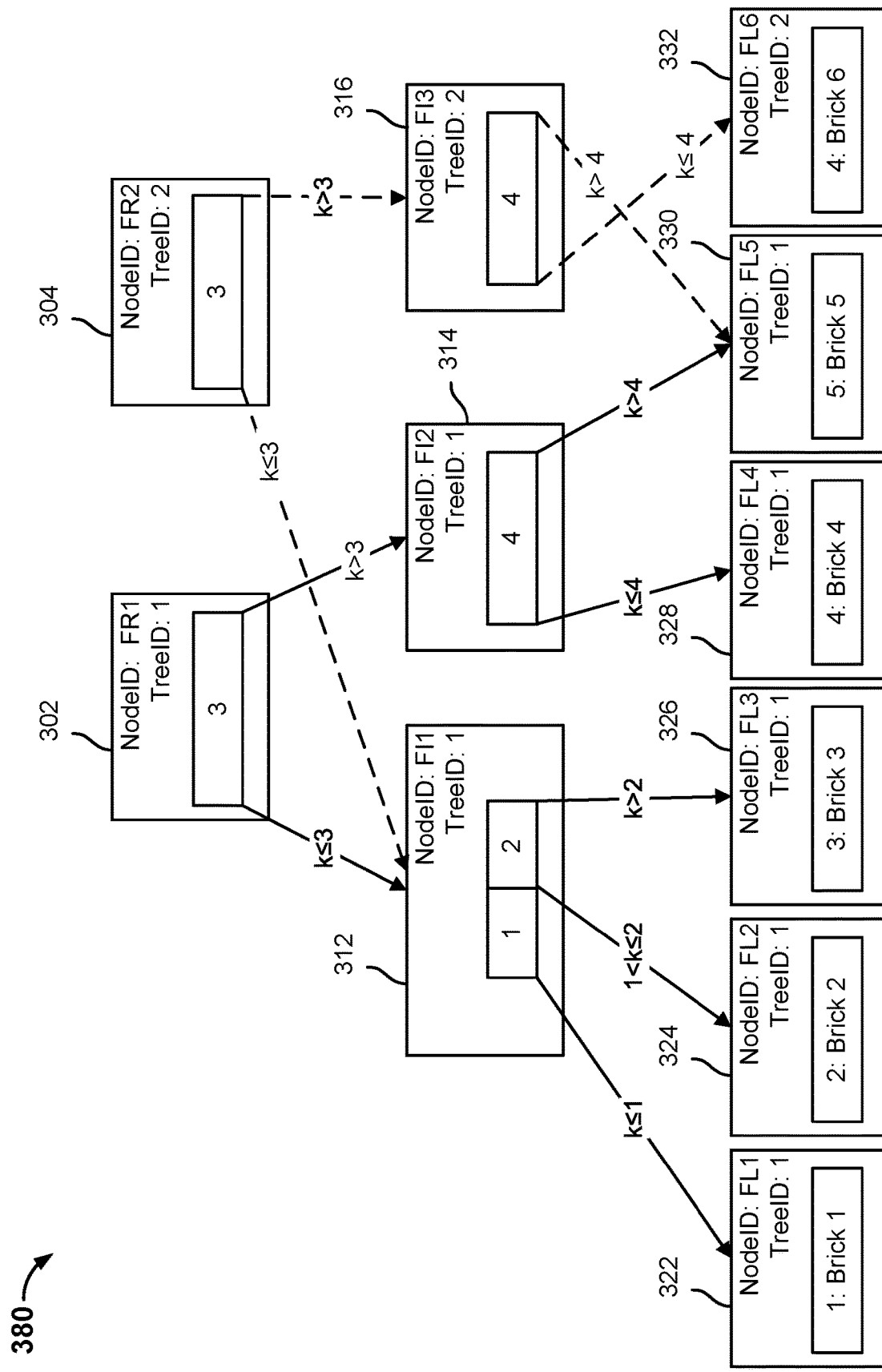
FIG. 3D is a block diagram illustrating an embodiment of a modified cloned file metadata tree.

FIG. 3D is a block diagram illustrating an embodiment of a modified cloned file metadata tree. The file metadata tree 380 shown in FIG. 3D illustrates a result of the modifications made to file metadata tree 380 as described with respect to FIG. 3C.

Figure 4A:
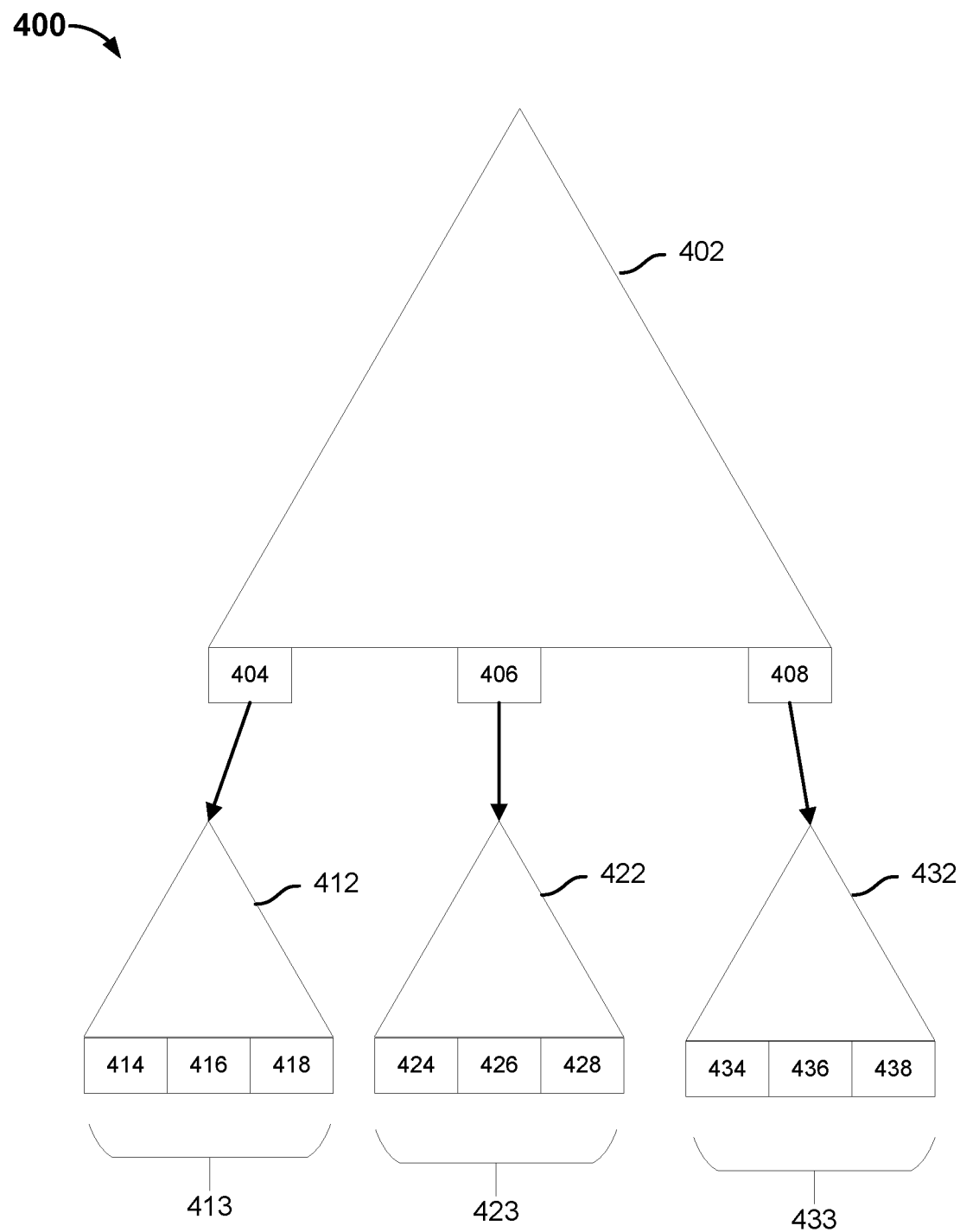
FIG. 4A is a block diagram illustrating an embodiment of a view of file system data.

FIG. 4A is a block diagram illustrating an embodiment of a view of file system data. In the example shown, file system data view 400 may be generated by a file system manager, such as file system manager 115. File system data view 400 may correspond to a backup snapshot of file system data. File system data view 400 includes a snapshot tree 402 and file metadata structures 412, 422, 432. Snapshot tree 402 includes leaf nodes 404, 406, 408. Snapshot tree 402 may include other leaf nodes that are not shown for explanation purposes.

Leaf nodes 404, 406, 408 include pointers to root nodes associated with file metadata structures 412, 422, 432, respectively. Leaf nodes 404, 406, 408 may be Modes. File metadata structures 412, 422, 432 correspond to different content files and store the metadata associated with the different content files. File metadata structure 412 (e.g., File 1) includes a set of leaf nodes 413. File metadata structure 412 stores the metadata associated with a first content file (e.g., File 1), file metadata structure 422 stores the metadata associated with a second content file (e.g., File 2), and file metadata structure 432 stores the metadata associated with a third content file (e.g., File 3).

File metadata structure 412 includes leaf nodes 414, 416, 418. A leaf node may be configured to store a value of a brick that stores one or more data chunks associated with the content file corresponding to a file metadata structure. For example, leaf node 414 is configured to store a value of a brick (i.e., brick identifier) associated with a first subset of data chunks associated with a first content file, leaf node 416 is configured to store a value of a brick associated with a second subset of data chunks associated with the first content file, and leaf node 418 is configured to store a value of a brick associated with a third subset of data chunks associated with the first content file. The brick identifier identifies a data brick storing one or more data chunks of a content file.

File metadata structure 422 includes leaf nodes 424, 426, 428. File metadata structure 422 (e.g., File 2) includes a set of leaf nodes 423. Leaf node 424 is configured to store a value of a brick associated with a first subset of data chunks associated with a second content file, leaf node 426 is configured to store a value of a brick associated with a second subset of data chunks associated with the second content file, and leaf node 428 is configured to store a value of a brick associated with a third subset of data chunks associated with the second content file.

File metadata structure 432 includes leaf nodes 434, 436, 438. File metadata structure 432 (e.g., File 3) includes a set of leaf nodes 433. Leaf node 434 is configured to store a value of a brick associated with a first subset of data chunks associated with a third content file, leaf node 436 is configured to store a value of a brick associated with a second subset of data chunks associated with a third content file, and leaf node 438 is configured to store a value of a brick associated with a third subset of data chunks associated with a third content file.

A file system manager allocates a default minimum amount of storage for metadata associated with a file, e.g., the metadata stored in a file metadata structure. The metadata associated with file metadata structure 412 is stored separately from the bricks referenced by leaf nodes 414, 416, 418. The metadata associated with file metadata structure 422 is stored separately from the bricks referenced by leaf nodes 424, 426, 428. The metadata associated with file metadata structure 432 is stored separately from the bricks referenced by leaf nodes 434, 436, 438. The size of the content files corresponding to file metadata structures 412, 422, 432 may be considerably smaller than the default minimum amount of storage associated with file metadata structures 412, 422, 432.

Figure 4B:
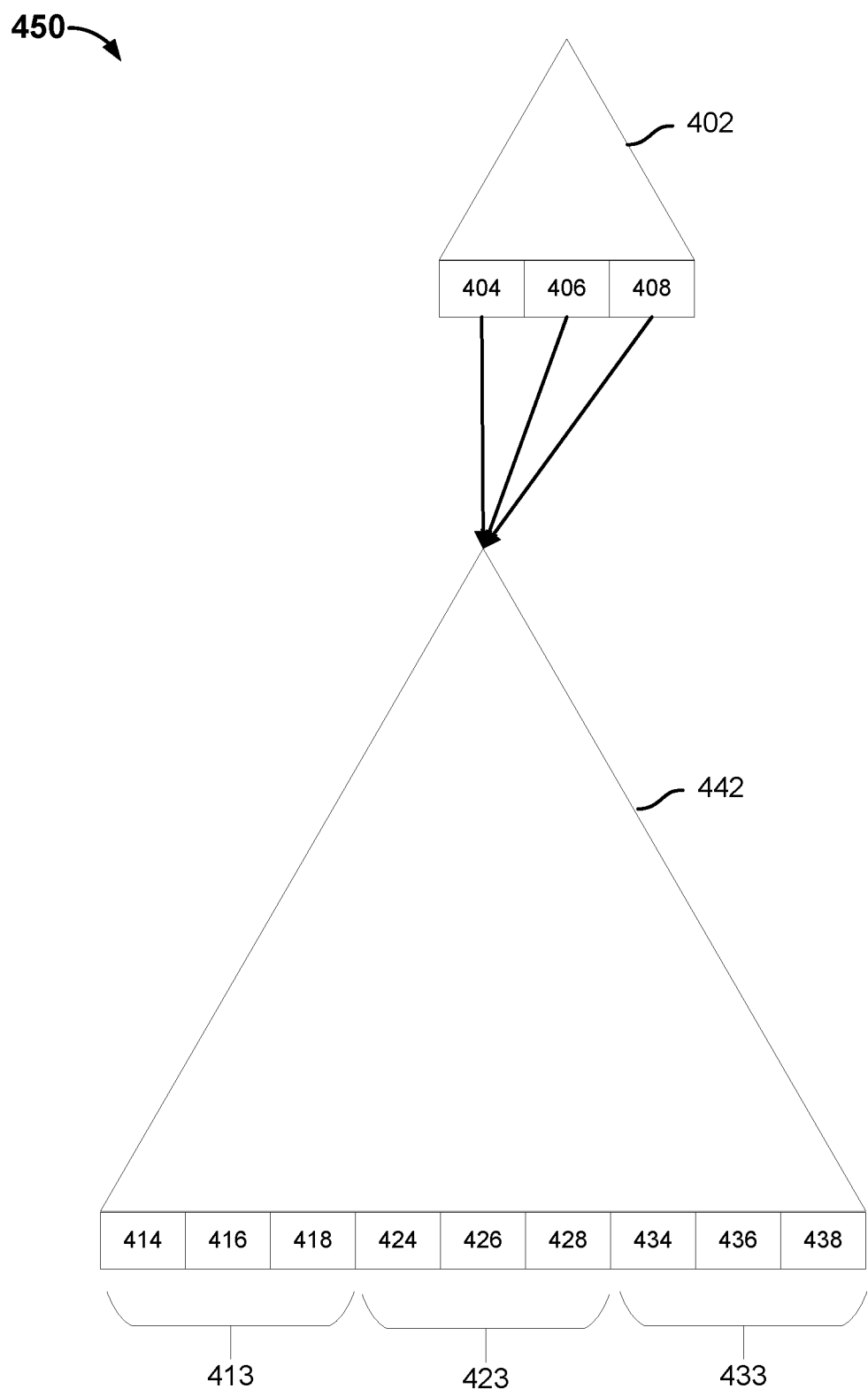
FIG. 4B is a block diagram illustrating an embodiment of a view of file system data.

FIG. 4B is a block diagram illustrating an embodiment of a view of file system data. In the example shown, file system data view 450 may be generated by a file system manager, such as file system manager 115. File system data view 450 may correspond to an optimized version of a backup snapshot of file system data.

File system data view 450 includes a snapshot tree 402 and a file metadata structure 442. Snapshot tree 402 includes leaf nodes 404, 406, 408. Snapshot tree 402 may include other leaf nodes that are not shown for explanation purposes.

File metadata structures 412, 422, 432 of FIG. 4A may correspond to the metadata associated with content files that are less than a threshold size. When a metadata associated with content file is received, it is allotted a default minimum amount of space in storage (e.g., 2 kB). The data chunks of data associated with a content file may be less than the allotted storage space. Having a large number of file metadata structures for a large number of small files (e.g., data associated with a content file that is less than a threshold size) is inefficient because there is a considerable amount of overhead in maintaining the metadata associated with the large number of small files.

A file system manager may combine a plurality of file metadata structures corresponding to content files that are less than a threshold size into a combined metadata structure, e.g., single file metadata tree.

In the example shown, file metadata structures 412, 422, 432 have been combined into file metadata tree 442. This corresponds to the metadata associated with files F1, F2, F3 being combined into a single file F123. In the example shown, file metadata structure 442 includes leaf nodes 414, 416, 418, 424, 426, 428, 434, 436, 438, which correspond to the leaf nodes of file metadata structures 412, 422, 432. In some embodiments, data associated with a content file stored in a leaf node of a snapshot tree may be moved from the leaf node of the snapshot tree to a leaf node of a combined metadata structure. The combined file associated with file metadata structure 442 includes the sets of leaf nodes 413, 423, 433.

In some embodiments, a leaf node of a snapshot tree includes a pointer to a portion of a combined metadata structure (e.g., a combined file metadata tree). For example, leaf node 404 may include a pointer to the set of leaf nodes 413, leaf node 406 may include a pointer to the set of leaf nodes 423, and leaf node 408 may include a pointer to the set of leaf nodes 433. The pointer may include a file offset range of the combined file to which the pointer points.

In other embodiments, a leaf node of a snapshot tree includes a pointer to a file metadata structure and a metadata store includes a record that indicates a portion of the file metadata structure to which the leaf node of the snapshot tree points.

Figure 4C:
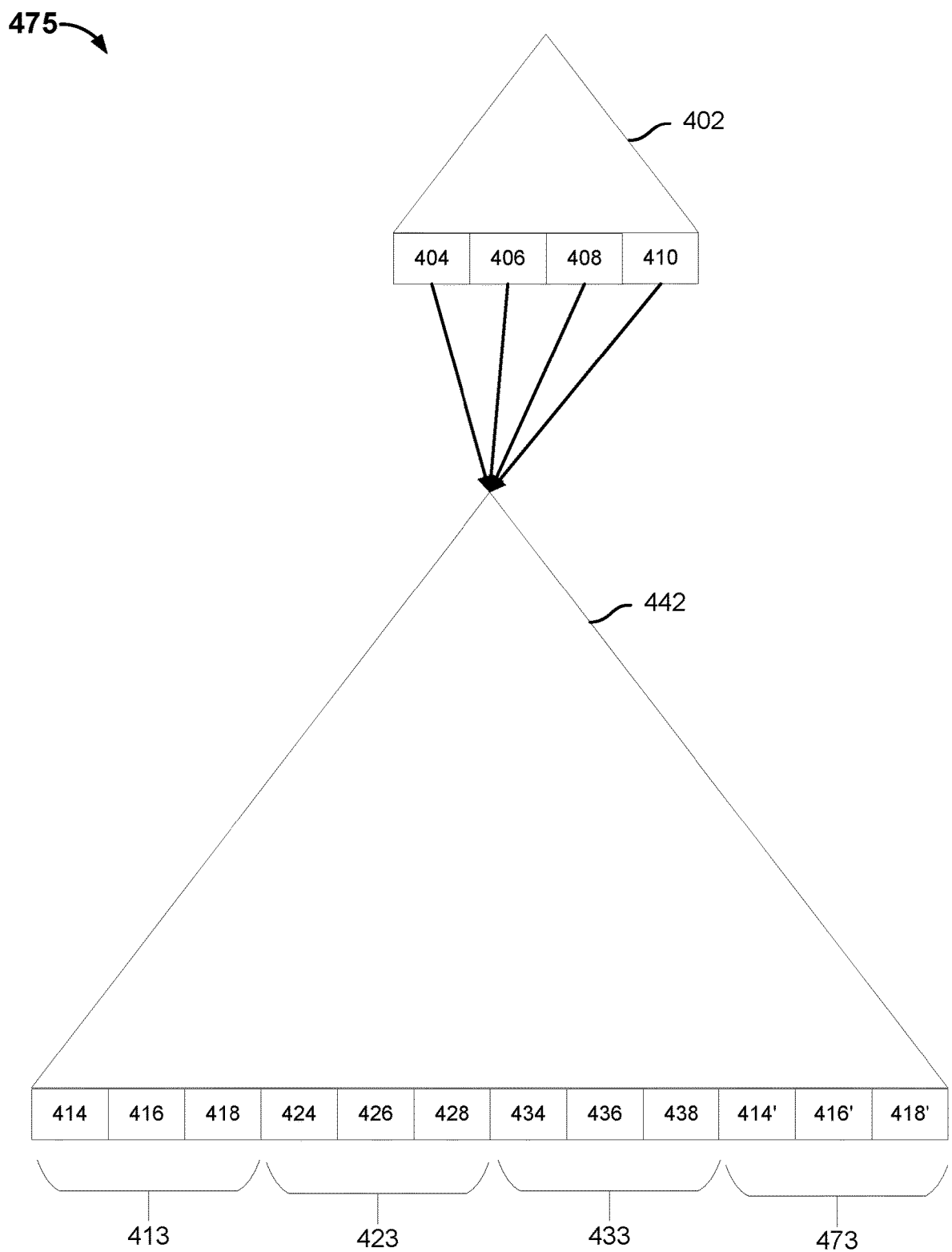
FIG. 4C is a block diagram illustrating an embodiment of a view of file system data.

FIG. 4C is a block diagram illustrating an embodiment of a view of file system data. In the example shown, file system data view 475 may be generated by a file system manager, such as file system manager 115.

File system data view 475 includes a snapshot tree 402 and a file metadata structure 442. Snapshot tree 402 includes leaf nodes 404, 406, 408, 410. Snapshot tree 402 may include other leaf nodes that are not shown for explanation purposes. Leaf node 404 may include a pointer to the set of leaf nodes 413, leaf node 406 may include a pointer to the set of leaf nodes 423, leaf node 408 may include a pointer to the set of leaf nodes 433, and leaf node 410 may include a pointer to the set of leaf nodes 473. The pointer may include a file offset range of the combined metadata structure to which the pointer points.

File metadata structure 442 includes the sets of leaf nodes 413, 423, 433, 473. The set of leaf nodes 413 corresponds to the metadata associated with a first file F1, the second set of leaf nodes 423 corresponds to the metadata associated with a second file F2, and the third set of leaf nodes 433 corresponds to the metadata associated with a third file F3. The fourth set of leaf nodes 473 is a clone of the set of leaf nodes 413.

A clone of the set of leaf nodes 413 may be generated for version control purposes. In the event a small file has been modified, the leaf nodes associated with the small file may be cloned. For example, the set of leaf nodes 413 may correspond to a first version of file F1 and the set of leaf nodes 473 may correspond to a second version of file F1. In some embodiments, the cloned set of leaf nodes is included in the same combined metadata structure. Each time a snapshot tree is generated, a plurality of combined metadata structures to be used for a plurality of small files may be generated. The number of combined metadata structures generated may be a pre-set number (e.g., 64). In other embodiments, the set of leaf nodes is cloned to a different combined metadata structure associated with snapshot tree 402.

The cloned leaf nodes may initially store the same values as the leaf nodes that were cloned. For example, leaf nodes 414, 414' initially store the same value, leaf nodes 416, 416' initially store the same value, and leaf nodes 418, 418' initially store the same value. A leaf node may store a brick identifier that allows the data associated with a file to be located. For example, leaf nodes 414, 414' may store the value "Brick 1," leaf nodes 416, 416' may store the value "Brick 2," and leaf nodes 418, 418' may store the value "Brick 3."

The value stored by leaf node 414', leaf node 416', or leaf node 418' may be modified to store a new value associated with the second version of file F1. For example, leaf node 414', leaf node 416', or leaf node 418' may be modified to store the value "Brick 4." "Brick 4" may be associated with one or more data chunks that are not included in the first version of file F1. The amount of time needed to generate the second version of file F1 may be reduced because the underlying data associated with File F1 is not copied. Creating a clone of the set of leaf nodes associated with a file is a near-instantaneous operation performed by a storage system.

Figure 4D:
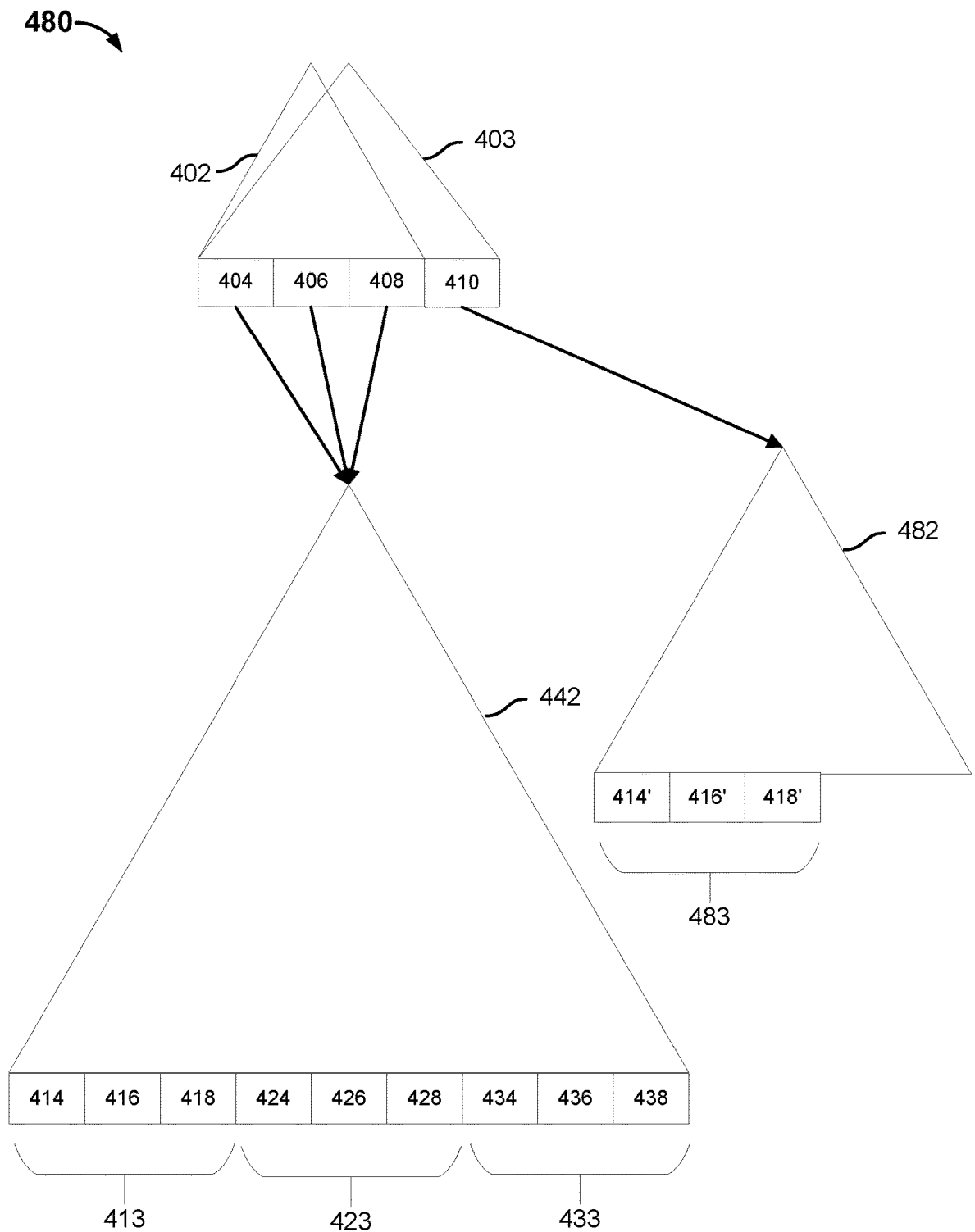
FIG. 4D is a block diagram illustrating an embodiment of a view of file system data.

FIG. 4D is a block diagram illustrating an embodiment of a view of file system data. In the example shown, file system data view 480 may be generated by a file system manager, such as file system manager 115.

File system data view 480 includes snapshot trees 402, 403 and file metadata structures 442, 482. Snapshot tree 402 includes leaf nodes 404, 406, 408. Snapshot tree 402 may correspond to the file system data of a primary system at a first moment in time. Snapshot tree 403 includes leaf nodes 404, 406, 408, 410. Snapshot tree 403 may correspond to the file system data of a primary system at a second moment in time. In other embodiments, snapshot tree 402 corresponds to the file system data of a storage system at a first moment in time. Snapshot tree 403 may correspond to the file system data of the storage system at a second moment in time. Snapshot trees 402, 403 may include other leaf nodes that are not shown for explanation purposes.

Leaf node 404 may include a pointer to the set of leaf nodes 413, leaf node 406 may include a pointer to the set of leaf nodes 423, leaf node 408 may include a pointer to the set of leaf nodes 433, and leaf node 410 may include a pointer to the set of leaf nodes 483. The pointer may include a file offset range of the combined file to which the pointer references.

File metadata structure 442 includes the sets of leaf nodes 413, 423, 433. The set of leaf nodes 413 corresponds to the metadata associated with a first file F1, the second set of leaf nodes 423 corresponds to the metadata associated with a second file F2, and the third set of leaf nodes 433 corresponds to the metadata associated with a third file F3. File metadata structure 482 includes the fourth set of leaf nodes 483, which are a clone of the set of leaf nodes 413.

A clone of the set of leaf nodes 413 may be generated for version control purposes. In the event a small file has been modified, the leaf nodes associated with the small file may be cloned. For example, the set of leaf nodes 413 may correspond to a first version of file F1 that was included in a first backup snapshot received from a primary system and the set of leaf nodes 483 may correspond to a second version of file F1 that was included in a second backup snapshot received from the primary system.

Initially, leaf nodes 414, 414' store the same value, leaf nodes 416, 416' store the same value, and leaf nodes 418, 418' store the same value. A leaf node may store a brick identifier that allows the data associated with a file to be located. For example, leaf nodes 414, 414' may store the value "Brick 1," leaf nodes 416, 416' may store the value "Brick 2," and leaf nodes 418, 418' may store the value "Brick 3."

The value stored by leaf node 414', leaf node 416', or leaf node 418' may be modified to store a new value associated with the second version of file F1. For example, leaf node 414', leaf node 416', or leaf node 418' may be modified to store the value "Brick 4." "Brick 4" may be associated with one or more data chunks that are not included in the first version of file F1. The amount of time needed to generate the second version of file F1 may be reduced because the underlying data associated with File F1 is not copied. Creating a clone of the set of leaf nodes associated with a file is a near-instantaneous operation performed by a storage system.

Figure 5:
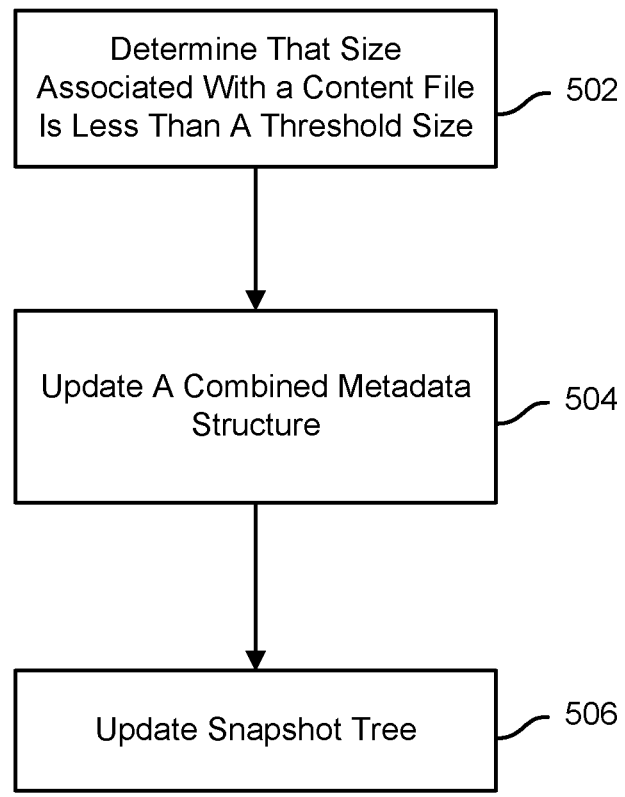
FIG. 5 is a flow chart illustrating an embodiment of a process for optimizing the storage of small files.

FIG. 5 is a flow chart illustrating an embodiment of a process for optimizing the storage of small files. In the example shown, process 500 may be performed by a storage system, such as storage system 112.

At 502, a size associated with a content file is determined to be less than a threshold size. In some embodiments, the size associated with the content file is determined when a storage system receives a backup snapshot from a primary system. A backup snapshot may be comprised of file system data of a primary system. The file system data is comprised of a plurality of content files and their associated metadata. The size of the data associated with a content file may be determined based on the size of the content file.

In other embodiments, a content file may reduce in size between backup snapshots. As a result, the size of the file may reduce from being greater than or equal to the threshold size to being less than the threshold size. For example, a content file associated with a first backup snapshot may be larger than the file threshold, but after the second backup snapshot, the content file may be less than the file threshold. As a result, the data associated with the content file may be estimated to be less than the threshold size and the content file is considered to be a "small file."

At 504, a combined metadata structure is updated. In some embodiments, the file metadata structures associated with content files less than the threshold size are combined into a combined metadata structure (e.g., a combined file metadata tree).

Each time a snapshot tree is generated, a plurality of combined metadata structures may be generated to be used for a plurality of small files. For example, a first snapshot tree may be associated with a first set of combined metadata structures and a second snapshot tree may be associated with a second set of combined metadata structures. The number of combined metadata structures generated may be a pre-set number (e.g., 64). Each combined metadata tree may be configured to hold up to a threshold amount of metadata (e.g., 1 TB). One of the generated combined metadata structures may be updated to include the metadata associated with one or more content files that are less than the threshold size.

The storage system may receive a backup snapshot that includes a plurality of content files that are less than the threshold size. The storage system may insert the metadata associated with the plurality of content files that are less than the threshold size into one of the generated combined metadata structures.

The storage system may store one or more legacy content files that are less than the threshold size. The storage system may store one or more file metadata structures corresponding to the one or more legacy content files. In some embodiments, data associated with a legacy content file that is stored in a leaf node of a snapshot tree is moved from the snapshot tree into the combined metadata structure.

At 506, a snapshot tree is updated. The snapshot tree may be updated to reference a first portion of the combined metadata structure corresponding to the first content file and to reference a second portion of the combined metadata structure corresponding to the second content file. A leaf node of the snapshot tree may be updated to indicate the offset ranges associated with the combined metadata structure. For example, a first offset range associated with the combined metadata structure may be associated with a first file, a second offset range associated with the combined metadata structure may be associated with a second file, . . . , and an nth offset range associated with the combined metadata structure may be associated with an nth file. Each offset range may be associated with a set of data keys. A combined metadata structure reservation node may be updated to reflect the offset ranges associated with a combined metadata structure that have been used and/or reserved for use by a storage node of the storage system.

In some embodiments, a view of file system data corresponding to a backup snapshot is generated when a backup snapshot is received from a primary system. The view may be comprised of a snapshot tree and a plurality of file metadata trees. Instead of generating a plurality of file metadata trees corresponding to the content files with data less than the threshold size, the file system manager may generate a combined metadata structure corresponding to the content files. One or more leaf nodes of the snapshot tree may include corresponding pointers to the combined metadata structure.

In other embodiments, a view of file system data corresponding to a backup snapshot is updated after the view of file system data corresponding to a backup snapshot is generated. A leaf node of a snapshot tree that points to one of the content files is updated. The leaf node is updated such that it no longer points to a file metadata tree corresponding to the content file, but instead points to the combined metadata structure. The leaf node may include a pointer to a portion of the combined metadata structure that corresponds to one of the content files. For example, a leaf node of a snapshot tree may have previously pointed to a file metadata tree associated with the metadata associated with file F1. The leaf node of the snapshot tree may be updated to point to the portion of the combined metadata structure that corresponds to the metadata associated with file F1. The view of the file system data corresponding to the backup snapshot may be updated as a maintenance process and may not necessarily be updated in response to receiving a backup snapshot from a primary system.

In other embodiments, a view of file system data corresponding to a backup snapshot is updated after a backup snapshot is received. The size of data associated with a content file included in a first backup snapshot may be greater than or equal to the threshold size. The size of the data associated with the content file included in a second backup snapshot may be less than the threshold size. The view of the file system data may be updated to reflect this change. For example, a leaf node of a snapshot tree that points to a file metadata tree corresponding to the content file may be updated to point to a combined metadata structure that includes the metadata associated with the content file. The leaf node may include a pointer to a portion of the combined metadata structure that corresponds to the metadata associated with the content file.

File offset information of the metadata associated with the content files may be updated in a metadata store. A metadata store may be updated to indicate which portions of a combined metadata structure file correspond to metadata associated with a content file. For example, a metadata store may be updated to indicate that file offset 0-2.25 MB of the combined metadata structure file F123 corresponds to metadata associated with content file F1, file offset 2.25 MB-4.5 MB of the combined metadata structure file F123 corresponds to metadata associated with content file F2, and file offset 4.5 MB-7.0 MB of the combined metadata structure file F123 corresponds to metadata associated with content file F3. In some embodiments, the file offset information of the combined metadata structure file for metadata associated with a content file is stored in a leaf node of a snapshot tree.

Figure 6A:
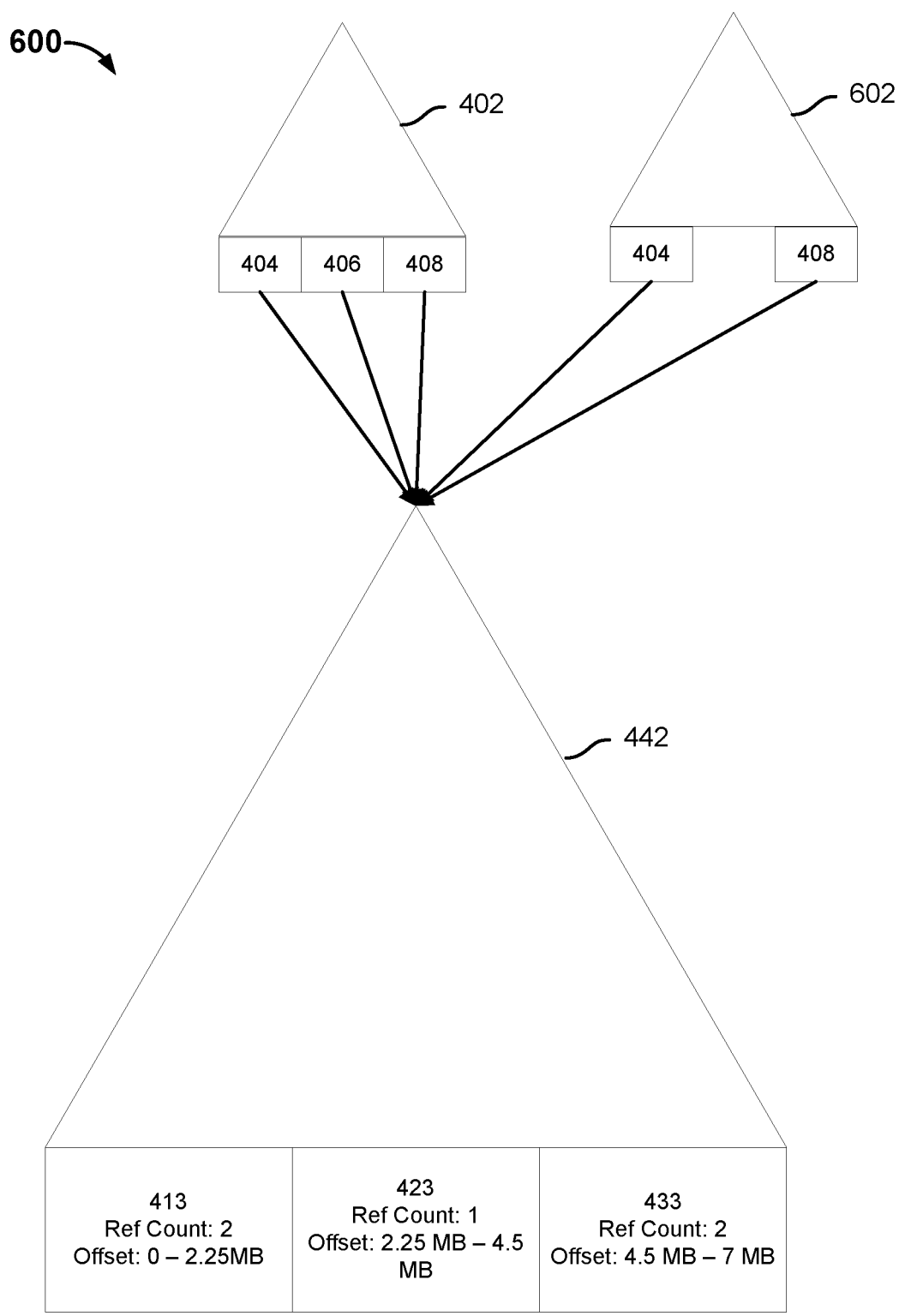
FIG. 6A is a block diagram illustrating an embodiment of file system data views.

FIG. 6A is a block diagram illustrating an embodiment of file system data views. In the example shown, file system data views 600 may be generated by a file system manager, such as file system manager 115. File system data views 600 includes a first view of file system data corresponding to a first backup snapshot and a second view of file system data corresponding to a second backup snapshot. The first view of file system data corresponding to the first backup snapshot includes snapshot tree 402 and file metadata tree 442. Snapshot tree 402 includes leaf nodes 404, 406, 408. Leaf node 404 includes a pointer to the set of leaf nodes 413 associated with the metadata associated with content file F1, leaf node 406 includes a pointer to the set of leaf nodes 423 associated with the metadata associated with content file F2, and leaf node 408 includes a pointer to the set of leaf nodes 433 associated with the metadata associated with content file F3. Snapshot tree 402 may include other leaf nodes that are not shown for explanation purposes.

The second view of file system data corresponding to the second backup snapshot includes snapshot tree 602 and file metadata tree 442. Snapshot tree 602 includes leaf nodes 404, 408. Snapshot tree 602 may include other leaf nodes that are not shown for explanation purposes. Snapshot tree 602 does not include leaf node 406 because the data associated with leaf node 406 may have been deleted or modified between the first backup snapshot and the second backup snapshot.

The sets of leaf nodes 413, 423, 433 are associated with a corresponding content file and associated metadata file. The associated metadata files are combined to create the combined file metadata tree 442. A set of leaf nodes is associated with a portion of the combined metadata structure file F123. For example, the set of leaf nodes 413 is associated with a file offset range 0 MB-2.25 MB of the combined metadata structure file F123, the set of leaf nodes 423 is associated with a file offset range 2.25 MB-4.5 MB of the combined metadata structure file F123, and the set of leaf nodes 433 is associated with a file offset range of 4.5 MB-7.0 MB of the combined metadata structure file F123.

The sets of leaf nodes 413, 423, 433 have a corresponding reference count. A reference count indicates a number of backup snapshot views that reference a node. For example, the set of leaf nodes 413 has a reference count of "2" because two backup snapshot views include pointers to the set of leaf nodes 413. The set of leaf nodes 423 has a reference count of "1" because the backup snapshot view that includes snapshot tree 402, but not the backup snapshot view that includes snapshot tree 602, includes a pointer to the set of leaf nodes 423. This may indicate that the set of leaf nodes 423 may have been deleted or modified between backup snapshots. For example, the set of leaf nodes 423 may have been modified such that the size of the data associated with content file F2 exceeds the threshold size. As a result, the metadata associated with content file F2 may have its own file metadata tree. The set of leaf nodes 433 has a reference count of "2" because the backup snapshot view that includes snapshot tree 402 and the backup snapshot view that includes snapshot tree 602 include pointers to the set of leaf nodes 433.

Figure 6B:
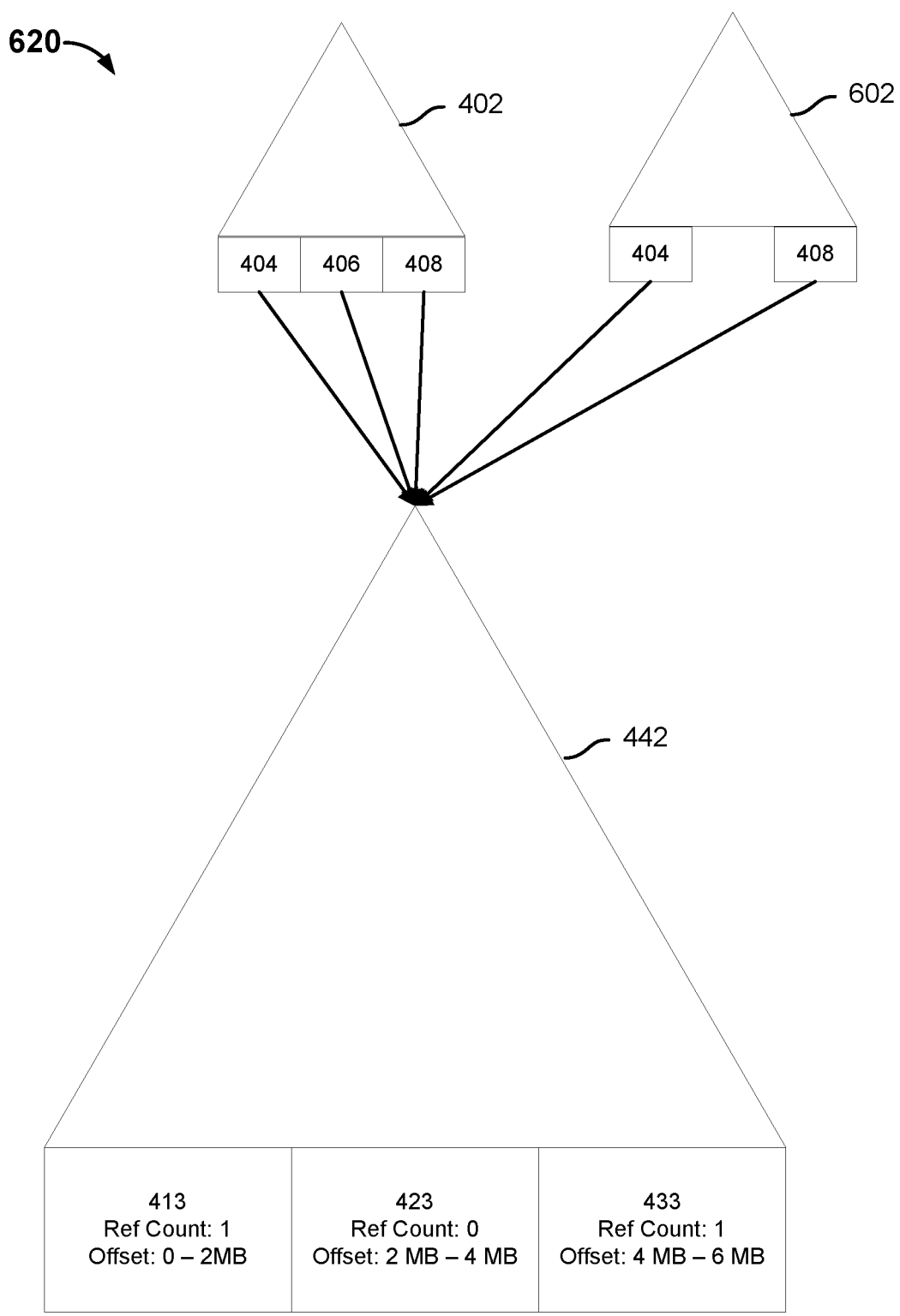
FIG. 6B is a block diagram illustrating an embodiment of file system data views.

FIG. 6B is a block diagram illustrating an embodiment of file system data views. In the example shown, file system data views 620 may be generated by a file system manager, such as file system manager 115. File system data views 620 includes a first view of the file system data corresponding to a first backup snapshot and a second view of the system data corresponding to a second backup snapshot. The first view of the file system data corresponding to the first backup snapshot includes snapshot tree 402 and file metadata tree 442. Snapshot tree 402 includes leaf nodes 404, 406, 408. Leaf node 404 includes a pointer to the set of leaf nodes 413 associated with the metadata associated with content file F1, leaf node 406 includes a pointer to the set of leaf nodes 423 associated with the metadata associated with content file F2, and leaf node 408 includes a pointer to the set of leaf nodes 433 associated with the metadata associated with content file F3. Snapshot tree 402 may include other leaf nodes that are not shown for explanation purposes. The second view of the file system data corresponding to the second backup snapshot includes snapshot tree 602 and file metadata tree 442. Snapshot tree 602 includes leaf nodes 404, 408. Snapshot tree 602 may include other leaf nodes that are not shown for explanation purposes. Snapshot tree 602 does not include leaf node 406 because the data associated with leaf node 406 may have been deleted or modified between the first backup snapshot and the second backup snapshot.

A backup snapshot may have an associated retention time policy. For example, a retention time policy may indicate that a backup snapshot is to be deleted after a certain period of time (days, weeks, months, years, etc.). In the event the retention time policy condition has been satisfied, a file system manager may determine that the file system data associated with a backup snapshot and its associated view (e.g., snapshot tree and associated file metadata trees) are to be removed from storage. This reduces the storage needed to maintain the backup snapshot views because the data contained in the snapshot tree and file metadata trees associated with a backup snapshot view may not be needed after a certain amount of time has passed. The file system manager may use a reference count to determine which files associated with a backup snapshot and associated metadata to delete and which files associated with a backup snapshot and associated metadata to keep. The reference count indicates a number of backup snapshot views that reference a content file.

In the example shown, a retention policy condition associated with a backup snapshot corresponding to snapshot tree 402 may have been satisfied. In some embodiments, a reference count of the one or more files trees associated with snapshot tree 402 is decremented. In other embodiments, a corresponding reference count associated with the plurality of content files included in a combined metadata structure file associated with snapshot tree 402 is decremented.

In the example shown, the reference count associated with the set of leaf nodes 413 corresponding to the metadata associated with content file F1 has been decremented from "2" to "1," the reference count associated with the set of leaf nodes 423 corresponding to the metadata associated with content file F2 has been decremented from "1" to "0," and the reference count associated with the set of leaf nodes 433 corresponding to the metadata associated with content file F3 has been decremented from "2" to "1."

Figure 6C:
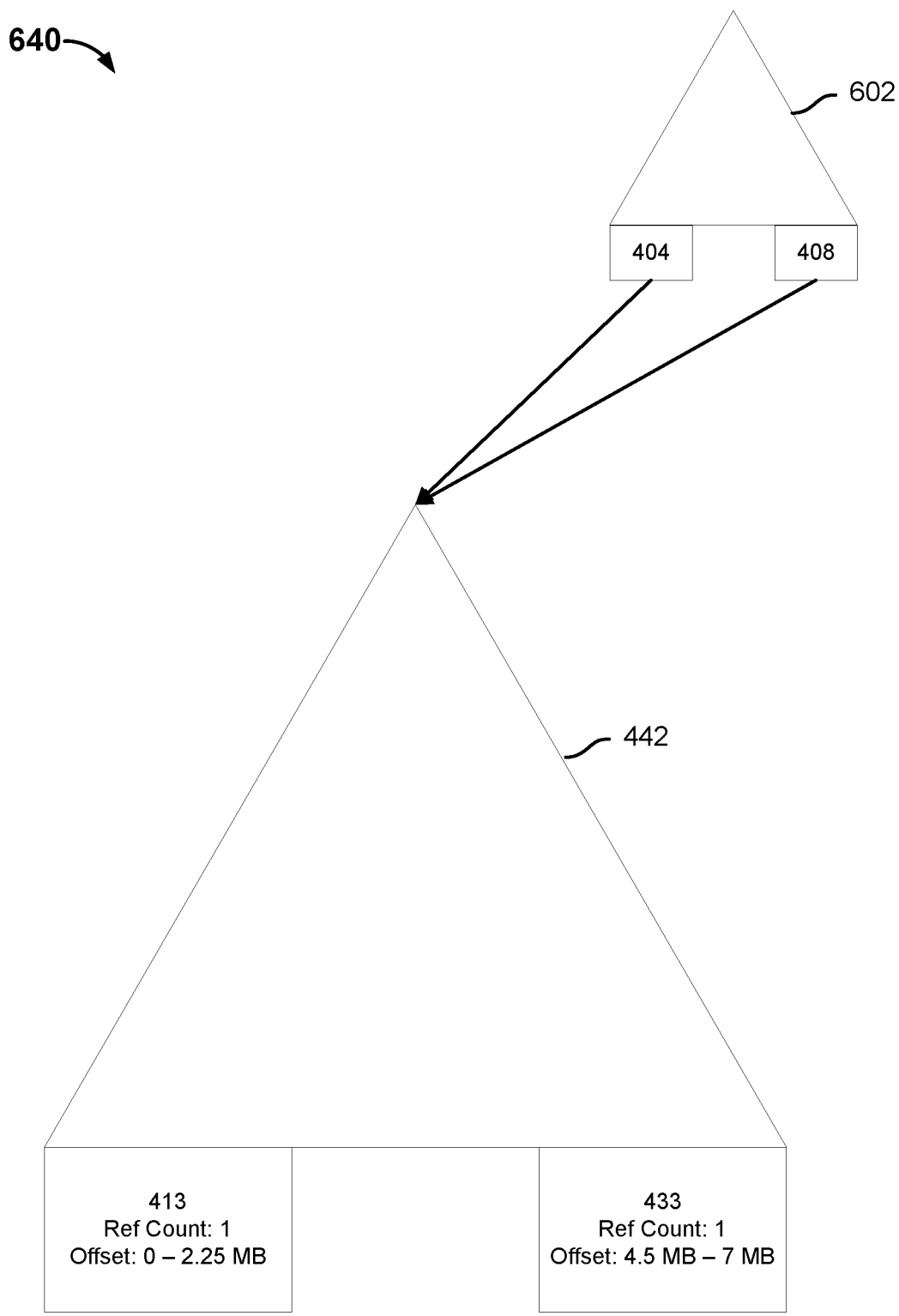
FIG. 6C is a block diagram illustrating an embodiment of a view of file system data.

FIG. 6C is a block diagram illustrating an embodiment of a view of file system data. In the example shown, file system data view 640 may be generated by a file system manager, such as file system manager 115.

In the example, the backup snapshot corresponding to the first view comprising snapshot tree 402 and associated file metadata trees have been deleted. The sets of leaf nodes 413, 433 were initially stored at the storage system when the storage system received the backup snapshot corresponding to the first view. However, those leaf node sets were not deleted from the storage system because those leaf node sets are referenced by other views of file system data. In contrast, the set of leaf nodes 423 and corresponding file data were deleted because no other views of file system data reference the set.

A set of leaf nodes that is associated with a backup snapshot to be deleted may not be deleted if the set is referenced by other views of file system data because each view of file system data provides a complete view of the file system data stored on a primary system. The file system manager would provide an incomplete view of the file system data for other backup snapshots if it were to delete leaf node sets 413, 433.

Figure 7:
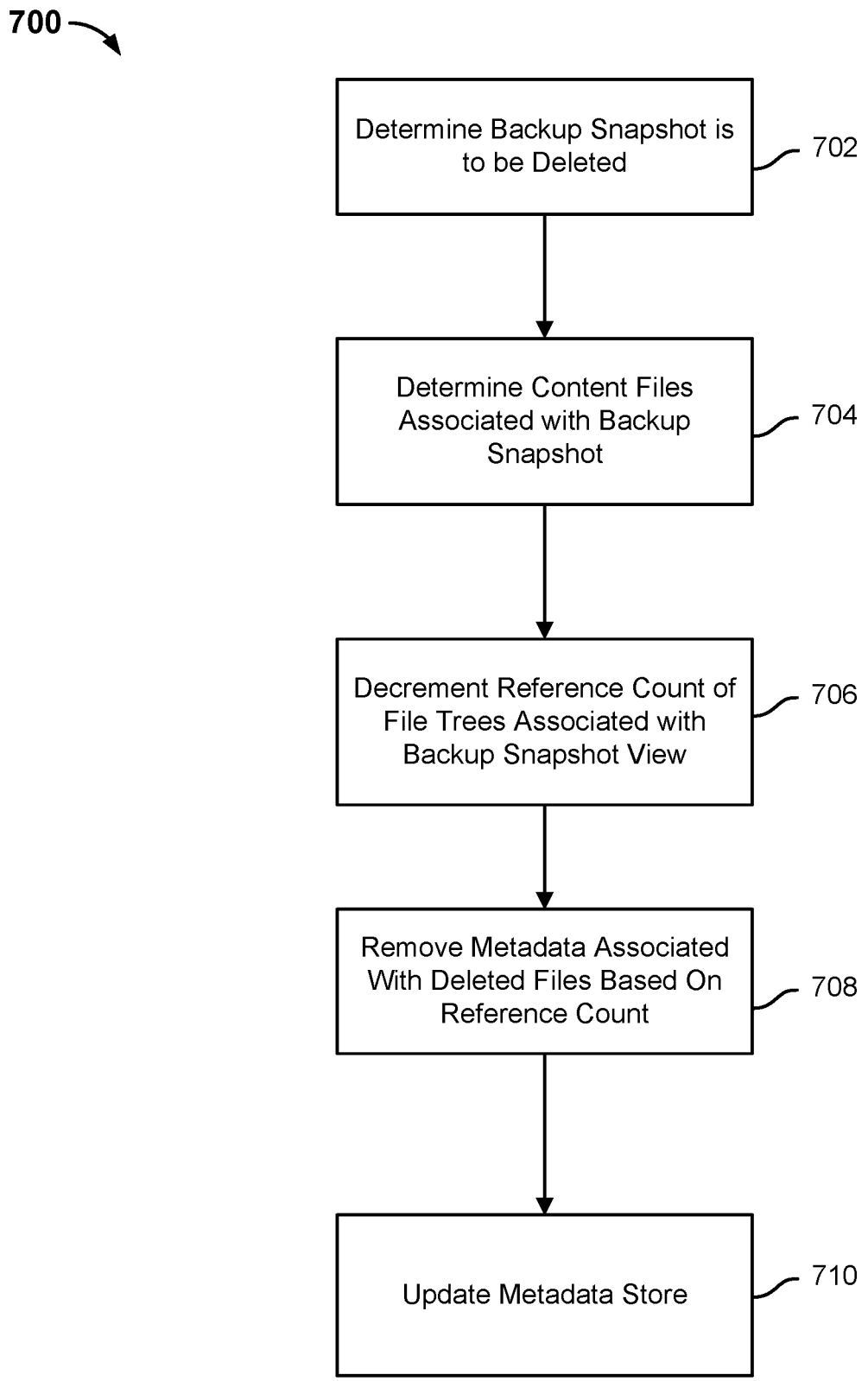
FIG. 7 is a flow chart illustrating an embodiment of a process for file maintenance.

FIG. 7 is a flow chart illustrating an embodiment of a process for file maintenance. In the example shown, process 700 may be performed by a storage system, such as storage system 112. Process 700 allows a file system manager to determine which content files of a backup snapshot and associated metadata to delete and which content files of a backup snapshot and associated metadata to keep.

At 702, it is determined that a backup snapshot is to be deleted. A retention time policy condition associated with a backup snapshot may be satisfied (e.g., a backup snapshot and associated view have been stored in storage for a particular amount of time) and it is determined that the backup snapshot and associated view are to be removed from storage. In the event the retention time policy condition has been satisfied, a file system manager may determine that the snapshot tree and associated file metadata trees are to be removed from storage. This reduces the storage needed to maintain the backup snapshot views because the data contained in the snapshot tree and file metadata trees associated with a backup snapshot view may not be needed after a certain amount of time has passed.

At 704, the one or more content files associated with the backup snapshot are determined. The one or more content files associated with a backup snapshot to be deleted may be determined by traversing the view associated with the backup snapshot to be deleted. The one or more content files are associated with metadata included in a backup snapshot.

At 706, a reference count associated with the one or more determined content files is decremented. The file system manager may use a reference count to determine which content files associated with a backup snapshot and associated metadata to delete and which content files associated with a backup snapshot and associated metadata to keep. The reference count indicates a number of backup snapshot views that reference a node included in a view. In some embodiments, each file metadata tree has an associated reference count. For example, a file metadata tree corresponds to metadata associated with a content file and a root node of the file metadata tree may be referenced by one or more views. In other embodiments, each portion of a file metadata tree corresponding to metadata associated with a content file has an associated reference count. For example, a file metadata tree may correspond to combined metadata that includes metadata associated with a plurality of content files. The metadata associated with a plurality of content files included in the combined file metadata tree may be referenced by different backup snapshot views. For example, the metadata associated with a first content file may be referenced by one backup snapshot while the metadata associated with a second content file may be referenced by two backup snapshots.

At 708, the metadata associated with one or more deleted files are removed based on the reference count. After the reference count associated with a node of a file metadata structure has been decremented, the file system manager may determine to delete metadata associated with content files with a reference count of "0" and to keep metadata associated with content files with a reference count that is greater than "0." The offset range of the file metadata tree corresponding to the deleted file may be deleted. That offset range may correspond to one or more chunk files stored on disk. The deleted portion of the one or more chunk files disk may be reclaimed on disk, for example, by using a defragmentation procedure.

At 710, a metadata store is updated to indicate storage ranges that are unused. In some embodiments, metadata associated with a content file that is part of a combined metadata structure is deleted. The file system manager may update the metadata store to indicate that an offset range of the combined metadata structure file is unused. In some embodiments, the file system manager may modify the combined metadata structure such that the deleted portion of the combined metadata structure is replaced with metadata associated with another content file.

Figure 8:
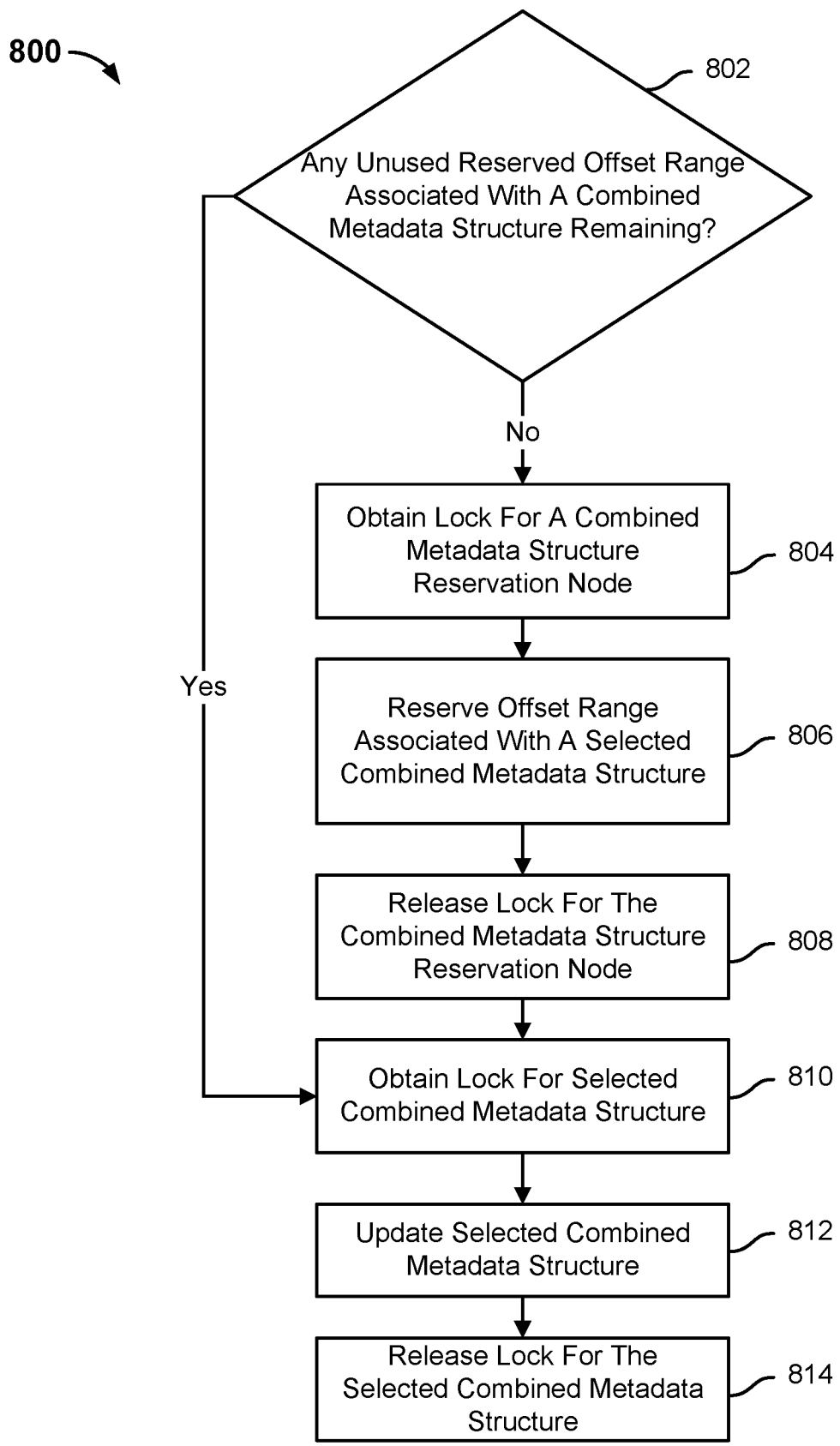
FIG. 8 is a flow chart illustrating an embodiment of a process for updating a combined metadata structure.

FIG. 8 is a flow chart illustrating an embodiment of a process for updating a combined metadata structure. In the example shown, process 800 may be performed by a storage node of a storage system, such as storage nodes 111, 113, 117 of storage system 112. Process 800 may be implemented to perform some or all of step 504 of process 500.

A storage system may be comprised of a plurality of storage nodes and a plurality of combined metadata structures. The storage nodes may update, in parallel, the plurality of combined metadata structures. However, two or more storage nodes should not update the same offset range of a combined metadata structure because the metadata associated with one or more content files may become corrupted.

A combined metadata structure may be configured to store a particular amount of metadata (e.g., 1 TB). A storage node may be required to reserve an offset range associated with the combined metadata structure. Once reserved by the storage node, one or more other storage nodes may be prevented from updating the reserved offset range. An offset range may be reserved for the storage node until the storage node has completely filled the reserved offset range with metadata associated with small files.

At 802, it is determined whether a storage node has any unused reserved offset range associated with a combined metadata structure remaining.

In the event it is determined that a storage node does not have any unused reserved offset range associated with a combined metadata structure remaining, process 800 proceeds to step 804. For example, a storage node may not have any reserved offset range associated with a combined metadata structure because the storage node has not reserved an offset range associated with a combined metadata structure. A storage node may not have any reserved offset range associated with a combined metadata structure because the storage node has used all of the previously reserved offset range associated with a combined metadata structure.

In the event it is determined that a storage node has some unused reserved offset range associated with a combined metadata structure remaining, process 800 proceeds to step 810. A storage node may have some unused reserved offset range associated with a combined metadata structure remaining because the storage node may have reserved a larger offset range than needed. For example, a storage node may have requested 64 GB of an offset range associated with a combined metadata structure, but only wrote 10 GB of metadata to the combined metadata structure. Instead of performing steps 804, 806, 808 each time the storage node needs to update a combined metadata structure, the storage node may save overhead by proceeding to step 810.

At 804, a lock for a combined metadata structure reservation node is obtained. A snapshot tree may be associated with a plurality of combined metadata structures to be used for a plurality of small files. The combined metadata structure reservation node may store a data structure that includes information associated with the plurality of combined metadata structures. Such information may include the different offset ranges associated with a combined metadata structure, the available offset ranges, and whether a node of a storage system has reserved a particular offset range associated with the combined metadata structure.

At 806, an offset range associated with a selected combined metadata structure is reserved. In some embodiments, a storage node randomly selects a combined metadata structure from the available combined metadata structures. In some embodiments, the storage node selects a specific combined metadata structure. In some embodiments, the storage node selects a combined metadata structure based on an assignment policy (e.g., round robin assignment, amount of storage available associated with a combined metadata tree, whether another storage node already has a lock on a combined metadata structure, etc.).

In some embodiments, the storage node is randomly assigned to a combined metadata structure that is selected by the storage system for the storage node. In some embodiments, the storage node is assigned to a combined metadata structure that is selected by the storage system for the storage node. In some embodiments, the storage node is assigned to a combined metadata structure that is selected by the storage system for the storage node based on an assignment policy (e.g., round robin assignment, amount of storage available associated with a combined metadata tree, whether another storage node already has a lock on a combined metadata structure, etc.).

The storage node of the storage system may reserve an offset range for the selected combined metadata structure by updating the data structure of the combined metadata structure reservation node. Once a reservation is obtained, this may prevent one or more other storage nodes from attempting to modify the same offset range of the selected combined metadata structure. In some embodiments, the offset range reservation is for a preset amount of storage (e.g., 64 GB). This may enable the storage node to write the metadata for a plurality of small files in the same write process. This may reduce the amount of overhead needed to modify/generate the metadata associated with a plurality of small files because instead of repeating steps 804 and 806 for each individual small file, the storage node may perform a single instance steps 804 and 806 to reserve a single offset range for a plurality of files.

At 808, the lock for the combined metadata structure reservation node is released. This may allow one or more other storage nodes of the storage system to request to modify a combined metadata structure once the lock for the combined metadata structure reservation node is released.

At 810, a lock for the selected combined metadata structure is obtained. A storage node having a lock for the selected combined metadata structure may prevent another storage node from modifying the selected combined metadata structure.

At 812, the selected combined metadata structure is updated. The storage node may update the selected combined metadata structure for a plurality of small files. For example, the storage node may update the selected combined metadata structure to include updated metadata associated with one or more existing small files and/or to include the metadata associated with one or more new small files. The storage node may update the selected combined metadata structure to include data for a portion of or all of the reserved offset range associated with the selected combined metadata structure.

To update the metadata associated with an existing small file, a file system manager of a storage system may clone the metadata associated with the existing small file and allow the storage node of the storage system to modify the cloned metadata. In some embodiments, the cloned metadata is included in the same combined metadata structure. For example, the metadata associated with a first version of a small file may be comprised of one or more leaf nodes. The one or more leaf nodes associated with the first version of the small file may be cloned in the same combined metadata structure. In other embodiments, the cloned metadata is included in a different combined metadata structure. The one or more leaf nodes associated with the first version of the small file may be cloned to a different file metadata structure. The data associated with an updated version of the existing small file (e.g., a content file) may be used to modify the cloned metadata associated with the existing small file. For example, a leaf node may be modified to reference a different brick. The amount of time needed to generate the updated version of the file may be reduced because the underlying data associated with the file is not copied. Creating a clone of the metadata associated with a file may be a near-instantaneous operation performed by a storage system.

At 814, the lock for the selected combined metadata structure is released. This may allow one or more other storage nodes to access the selected combined metadata structure and update the selected combined metadata structure.

Process 800 may reduce the number of collisions from a plurality of storage nodes attempting to update a particular combined metadata structure by allowing a single storage node to access the combined metadata structure reservation node at a time. Upon obtaining a lock for the combined metadata structure reservation node, the storage node may reserve an offset range associated with one of the combined metadata structures without another storage node, at the same time, trying to reserve the same offset range.

Figure 9:
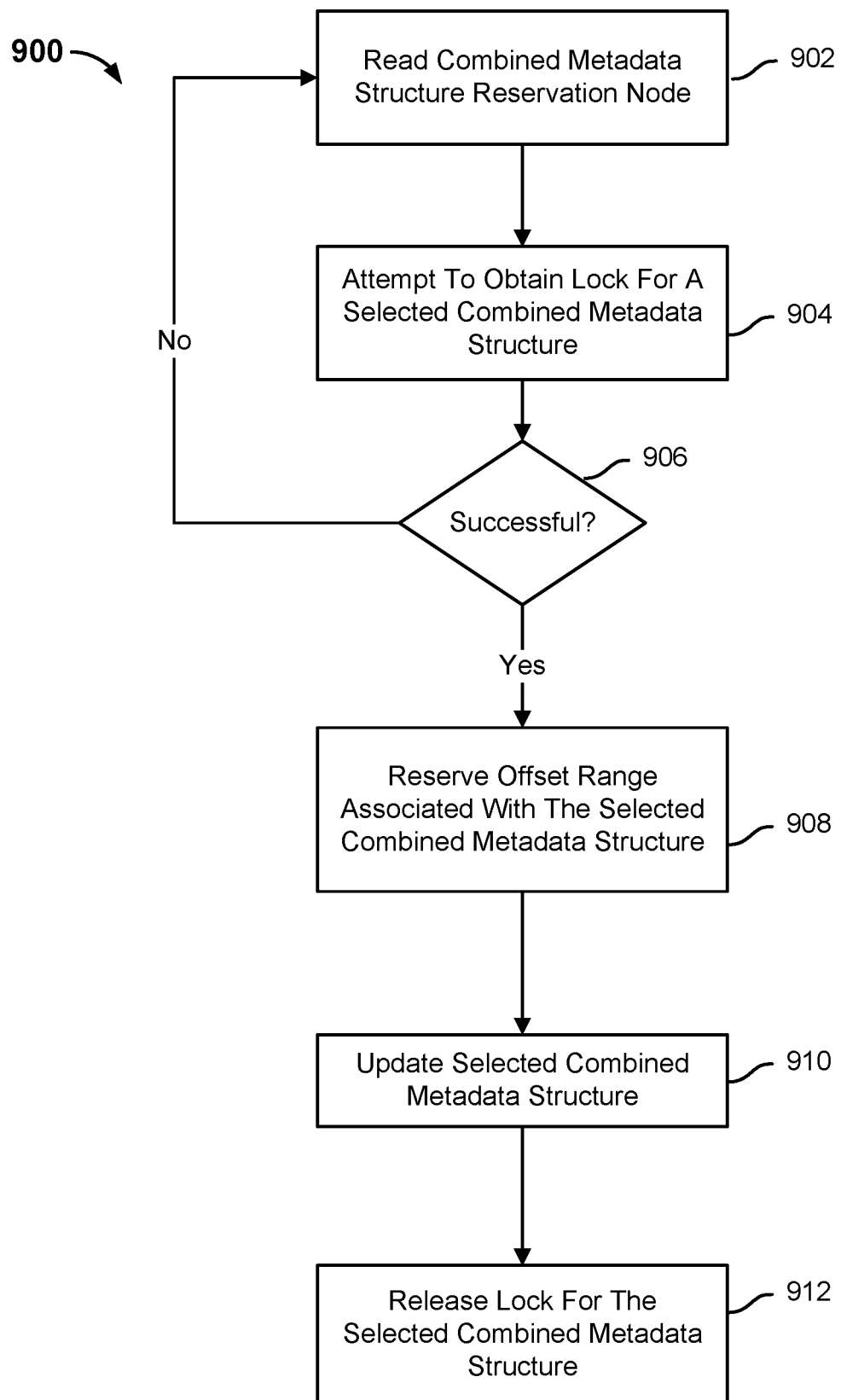
FIG. 9 is a flow chart illustrating an embodiment of a process for updating a combined metadata structure.

FIG. 9 is a flow chart illustrating an embodiment of a process for updating a combined metadata structure. In the example shown, process 900 may be performed by a storage node of a storage system, such as storage nodes 111, 113, 117 of storage system 112. Process 900 may be implemented to perform some or all of step 504 of process 500.

At 902, a combined metadata structure reservation node is read. A snapshot tree may be associated with a plurality of combined metadata structures to be used for a plurality of small files. The combined metadata structure reservation node may store a data structure that includes information associated with the plurality of combined metadata structures. Such information may include the different offset ranges associated with a combined metadata structure, the available offset ranges, and whether a node of a storage system has reserved a particular offset range associated with the combined metadata structure.

At 904, a lock for a selected combined metadata structure is attempted to be obtained. A storage node may attempt to obtain a lock for one of the plurality of combined metadata structures associated with the snapshot tree. The combined metadata structure may be selected based on information stored by the combined metadata structure reservation node.

For example, the combined metadata structure reservation node may include information that indicates that the combined metadata structure has an available offset range.

In some embodiments, the storage node randomly selects a combined metadata structure from the available combined metadata structures. In some embodiments, the storage node selects a specific combined metadata structure. In some embodiments, the storage node selects a combined metadata structure based on an assignment policy (e.g., round robin assignment, amount of storage available associated with a combined metadata tree, whether another storage node already has a lock on a combined metadata structure, etc.).

In some embodiments, the storage node is randomly assigned to a combined metadata structure that is selected by the storage system for the storage node. In some embodiments, the storage node is assigned to a combined metadata structure that is selected by the storage system for the storage node. In some embodiments, the storage node is assigned to a combined metadata structure that is selected by the storage system for the storage node based on an assignment policy (e.g., round robin assignment, amount of storage available associated with a combined metadata tree, whether another storage node already has a lock on a combined metadata structure, etc.).

At 906, it is determined whether the lock for the selected combined metadata structure is successfully obtained. A plurality of storage nodes may be attempting to update the same combined metadata structure. A preset number of combined metadata structures (e.g., 64) may be associated with a snapshot tree. A write lock may be required to update one of the combined metadata structures. A storage node that obtains a write lock for one of the combined metadata structures may prevent one or more other storage nodes from updating the combined metadata structures during the duration in which the storage node holds a write lock for the combined metadata structure.

In the event the lock for the selected combined metadata structure is successfully obtained, process 900 proceeds to 908. In the event the lock for the selected combined metadata structure is not successfully obtained, process 900 returns to 902. A storage node may be unsuccessful in obtaining a lock for the selected combined metadata structure because another storage node successfully obtained a lock for the combined metadata structure. The snapshot tree is associated with a plurality of other combined metadata structures that may be available for updates (e.g., a storage node does not hold a write lock for the other combined metadata structures). The storage node may attempt to obtain a lock for a different combined metadata structure associated with the snapshot tree.

At 908, an offset range associated with the selected combined metadata structure is reserved. The storage node of the storage system may reserve an offset range for the selected combined metadata structure by updating the data structure of the combined metadata structure reservation node. Once a reservation is obtained, this may prevent one or more other storage nodes from attempting to modify the same offset range of the selected combined metadata structure. In some embodiments, the offset range reservation is for a preset amount of storage (e.g., 64 GB). This may enable the storage node to write the metadata for a plurality of small files in the same write process. This may reduce the amount of overhead needed to modify/generate the metadata associated with a plurality of small files because instead of reserving a plurality of offset ranges for each individual small file (e.g., performing steps 902, 904, 906, 908 multiple times), the storage node may reserve a single offset range for a plurality of files (e.g., performing a single instance of steps 902, 904, 906, 908 in the event the lock is successfully obtained on the first attempt).

At 910, the selected combined metadata structure is updated. The storage node may update the selected combined metadata structure for a plurality of small files. For example, the storage node may update the selected combined metadata structure to include updated metadata associated with one or more existing small files and/or to include the metadata associated with one or more new small files. The storage node may update the selected combined metadata structure to include data for a portion of or all of the reserved offset range associated with the selected combined metadata structure.

To update the metadata associated with an existing small file, a file system manager of a storage system may clone the metadata associated with the existing small file and allow the storage node of the storage system to modify the cloned metadata. In some embodiments, the cloned metadata is included in the same combined metadata structure. For example, the metadata associated with a first version of a small file may be comprised of one or more leaf nodes. The one or more leaf nodes associated with the first version of the small file may be cloned in the same combined metadata structure. In other embodiments, the cloned metadata is included in a different combined metadata structure. The one or more leaf nodes associated with the first version of the small file may be cloned to a different file metadata structure. The data associated with an updated version of the existing small file (e.g., a content file) may be used to modify the cloned metadata associated with the existing small file. For example, a leaf node may be modified to reference a different brick. The amount of time needed to generate the updated version of the file may be reduced because the underlying data associated with the file is not copied. Creating a clone of the metadata associated with a file may be a near-instantaneous operation performed by a storage system.

At 912, the lock for the selected combined metadata structure is released. This may allow one or more other storage nodes to access the selected combined metadata structure and update the selected combined metadata structure.

In contrast to process 800, process 900 may reduce the amount of time needed to update a combined metadata structure because a lock does not need to be obtained for the combined metadata structure reservation node. A snapshot tree may have a single combined metadata structure reservation node and a plurality of storage nodes may be attempting to obtain a lock for the combined metadata structure reservation node at the same time. In process 800, one or more storage nodes may have to wait to obtain a lock for the combined metadata structure reservation node before they are able to obtain a lock for a combined metadata structure.

Although two or more storage nodes may be attempting to obtain a lock for the same combined metadata structure in process 900, a storage node may be able to obtain a lock for a combined metadata structure without a significant amount of delay in the event the storage node is unsuccessful in obtaining a lock for a combined metadata structure because, in some embodiments, there are more combined metadata structures than storage nodes. Thus, in the event a storage node is unable to obtain a lock for a first combined metadata structure, the storage node may be able to obtain a lock for one of the other combined metadata structures.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   determining that a size associated with a first content file is less than a threshold size, wherein metadata of the first content file is organized using a first file metadata structure, wherein a storage system allocated a default amount of space on a storage medium associated with the storage system to store the metadata of the first content file, wherein the first file metadata structure comprises a first root node, a first plurality of intermediate nodes, and a first plurality of leaf nodes with corresponding references to data chunks of the first content file;
   in response to a determination that the size associated with the first content file is less than the threshold size, updating a combined metadata structure at least in part by combining in the combined metadata structure, metadata of the first content file with metadata of a second content file included in a second file metadata structure, wherein the size associated with the second content file is less than the threshold size, wherein the second file metadata structure comprises a second root node, a second plurality of intermediate nodes, and a second plurality of leaf nodes with corresponding references to data chunks of the second content file, wherein the storage system allocated the default amount of space on the storage medium associated with the storage system to store the metadata of the second content file, wherein the combined metadata structure at least includes a third root node, the first plurality of leaf nodes, and the second plurality of leaf nodes, wherein updating the combined metadata structure includes:
  obtaining a lock for the combined metadata structure; and
  reserving a single offset range associated with the combined metadata structure from a plurality of available offset ranges for the metadata of the first content file and the metadata of the second content file; and
  writing the metadata of the first content file and the metadata of the second content file at the reserved offset range in a same write process;
updating a tree data structure including updating a first reference that references the first root node of the first file metadata structure to reference a first portion of the combined metadata structure corresponding to the first content file, updating a second reference that references the second root node of the second file metadata structure to reference a second portion of the combined metadata structure corresponding to the second content file, and updating a first leaf node of the tree data structure corresponding to the first content file and a second leaf node of the tree data structure corresponding to the second content file to reference the third root node of the combined metadata structure;
deleting the first file metadata structure and the second file metadata structure; and
reclaiming disk space associated with the first file metadata structure and the second file metadata structure.

2. The method of claim 1, wherein the size associated with the first content file is determined when the storage system receives a backup of the first content file from a source system.

3. The method of claim 1, further comprising receiving an updated version of the first content file.

4. The method of claim 3, further comprising:
determining a size associated with the updated version of the first content file is greater than or equal to the threshold size; and
removing the metadata of the first content file from the combined metadata structure.

5. The method of claim 4, further comprising replacing the metadata of the first content file with metadata of a third content file.

6. The method of claim 3, further comprising:
cloning the metadata associated with the first content file; and
modifying the cloned metadata associated with the first content file based on the updated version of the first content file.

7. The method of claim 1, further comprising receiving a backup snapshot that includes the first content file.

8. The method of claim 7, wherein the size associated with the first content file is determined based on the size of the first content file included in the backup snapshot.

9. The method of claim 1, further comprising determining the size associated with the first content file based in part by traversing a view of file system data corresponding to a backup snapshot.

10. The method of claim 1, wherein the first leaf node of the tree data structure that corresponds to the first content file is associated with a first file offset range of the combined metadata structure.

11. The method of claim 10, wherein the second leaf node of the tree data structure that corresponds to the second content file is associated with a second file offset range of the combined metadata structure.

12. The method of claim 1, further comprising generating a view of file system data corresponding to a backup snapshot, wherein the view includes the tree data structure and the combined metadata structure.

13. The method of claim 12, wherein the first leaf node of the tree data structure includes a pointer to the first root node of the first file metadata structure that corresponds to the first content file.

14. The method of claim 13, wherein updating the tree data structure includes updating the pointer of the first leaf node of the tree data structure to reference the third root node of the combined metadata structure instead of referencing the first root node of the first file metadata structure that corresponds to the first content file.

15. The method of claim 1, wherein updating the combined metadata structure includes reading a combined metadata structure reservation node.

16. The method of claim 15, wherein updating the combined metadata structure further includes obtaining a lock for the combined metadata structure.

17. The method of claim 16, wherein updating the combined metadata structure further includes reserving an offset range associated with the combined metadata structure.

18. A computer program product, the computer program product being embodied in a non-transitory computer readable storage medium and comprising computer instructions for:
  determining that a size associated with a first content file is less than a threshold size, wherein metadata of the first content file is organized using a first file metadata structure, wherein a storage system allocated a default amount of space on a storage medium associated with the storage system to store the metadata of the first content file, wherein the first file metadata structure comprises a first root node, a first plurality of intermediate nodes, and a first plurality of leaf nodes with corresponding references to data chunks of the first content file;
  in response to a determination that the size associated with the first content file is less than the threshold size, updating a combined metadata structure at least in part by combining in the combined metadata structure, metadata of the first content file with metadata of a second content file included in a second file metadata structure, wherein the size associated with the second content file is less than the threshold size, wherein the second file metadata structure comprises a second root node, a second plurality of intermediate nodes, and a second plurality of leaf nodes with corresponding references to data chunks of the second content file, wherein the storage system allocated the default amount of space on the storage medium associated with the storage system to store the metadata of the second content file, wherein the combined metadata structure at least includes a third root node, the first plurality of leaf nodes, and the second plurality of leaf nodes, wherein updating the combined metadata structure includes:
    obtaining a lock for the combined metadata structure;
    reserving a single offset range associated with the combined metadata structure from a plurality of available offset ranges for the metadata of the first content file and the metadata of the second content file; and writing the metadata of the first content file and the metadata of the second content file at the reserved offset range in a same write process;

updating a tree data structure including updating a first reference that references the first root node of the first file metadata structure to reference a first portion of the combined metadata structure corresponding to the first content file, updating a second reference that references the second root node of the second file metadata structure to reference a second portion of the combined metadata structure corresponding to the second content file, and updating a first leaf node of the tree data structure corresponding to the first content file and a second leaf node of the tree data structure corresponding to the second content file to reference the third root node of the combined metadata structure;

deleting the first file metadata structure and the second file metadata structure; and reclaiming disk space associated with the first file metadata structure and the second file metadata structure.

19. A system, comprising:

one or more processors configured to:

determine that a size associated with a first content file is less than a threshold size, wherein metadata of the first content file is organized using a first file metadata structure, wherein a storage system allocated a default amount of space on a storage medium associated with the storage system to store the metadata of the first content file, wherein the first file metadata structure comprises a first root node, a first plurality of intermediate nodes, and a first plurality of leaf nodes with corresponding references to data chunks of the first content file;

in response to a determination that the size associated with the first content file is less than the threshold size, update a combined metadata structure at least in part by combining in the combined metadata structure, metadata of the first content file with metadata of a second content file included in a second file metadata structure, wherein the size associated with the second content file is less than the threshold size, wherein the second file metadata structure comprises a second root node, a second plurality of intermediate nodes, and a second plurality of leaf nodes with corresponding references to data chunks of the second content file, wherein the storage system allocated the default amount of space on the storage medium associated with the storage system to store the metadata of the second content file, wherein the combined metadata structure at least includes a third root node, the first plurality of leaf nodes, and the second plurality of leaf nodes, wherein to update the combined metadata structure, the one or more processors are configured to:

obtain a lock for the combined metadata structure;

reserve a single offset range associated with the combined metadata structure from a plurality of available offset ranges for the metadata of the first content file and the metadata of the second content file; and write the metadata of the first content file and the metadata of the second content file at the reserved offset range in a same write process;

update a tree data structure including updating a first reference that references the first root node of the first file metadata structure to reference a first portion of the combined metadata structure corresponding to the first content file, updating a second reference that references the second root node of the second file metadata structure to reference a second portion of the combined metadata structure corresponding to the second content file, and updating a first leaf node of the tree data structure corresponding to the first content file and a second leaf node of the tree data structure corresponding to the second content file to reference the third root node of the combined metadata structure;

deleting the first file metadata structure and the second file metadata structure; and reclaiming disk space associated with the first file metadata structure and the second file metadata structure; and a memory coupled to the one or more processors and configured to provide the one or more processors with instructions.

* * * * *